(12) United States Patent
Tomosugi

(10) Patent No.: US 12,321,892 B2
(45) Date of Patent: Jun. 3, 2025

(54) INFORMATION PROCESSING SYSTEM, NON-TRANSITORY RECORDING MEDIUM, AND ATTRIBUTE SETTING METHOD

(71) Applicant: Ryoh Tomosugi, Kanagawa (JP)

(72) Inventor: Ryoh Tomosugi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/329,037

(22) Filed: Jun. 5, 2023

(65) Prior Publication Data

US 2023/0419260 A1 Dec. 28, 2023

(30) Foreign Application Priority Data

Jun. 22, 2022 (JP) ................................ 2022-100268
Jan. 12, 2023 (JP) ................................ 2023-003153

(51) Int. Cl.
| | |
|---|---|
| *G06Q 10/10* | (2023.01) |
| *G06F 3/04845* | (2022.01) |
| *G06Q 10/02* | (2012.01) |
| *G06Q 10/06* | (2023.01) |
| *G06Q 10/0633* | (2023.01) |
| *G06Q 10/1093* | (2023.01) |
| *H04L 67/303* | (2022.01) |

(52) U.S. Cl.
CPC ......... *G06Q 10/10* (2013.01); *G06F 3/04845* (2013.01); *G06Q 10/02* (2013.01); *G06Q 10/06* (2013.01); *G06Q 10/0633* (2013.01); *G06Q 10/1095* (2013.01); *H04L 67/303* (2013.01)

(58) Field of Classification Search
CPC ............ G06Q 10/0836; G06Q 10/0633; H04L 67/1097
See application file for complete search history.

(56) References Cited

U.S. PATENT DOCUMENTS

| 5,579,231 A | * | 11/1996 | Sudou | .............. G05B 19/41835 700/95 |
| 11,805,170 B2 | * | 10/2023 | Capps | .................. H04L 67/1097 |
| 2008/0208654 A1 | * | 8/2008 | Nahikian | ........... G06Q 10/0633 705/7.33 |
| 2011/0118880 A1 | * | 5/2011 | Diwakar | ................ G05B 15/02 700/277 |

(Continued)

FOREIGN PATENT DOCUMENTS

| JP | 2010-079585 | 4/2010 |
| JP | 2019-192041 | 10/2019 |
| JP | 2021-196780 | 12/2021 |

OTHER PUBLICATIONS

Extended European Search Report for 23177427.4 mailed on Nov. 22, 2023.

*Primary Examiner* — Barbara B Anyan
(74) *Attorney, Agent, or Firm* — IPUSA, PLLC

(57) ABSTRACT

An information processing system, a non-transitory recording medium, and an attribute setting method. The information processing system receives area information for designating equipment and attribute information indicating attribute to be set to the equipment, the area information and the attribute information being set at a first terminal device communicably connected to the information processing system through a network, and stores in one or more memories, the attribute information in association with the equipment designated by the area information.

18 Claims, 25 Drawing Sheets

(56) References Cited

U.S. PATENT DOCUMENTS

| | | | |
|---|---|---|---|
| 2013/0096964 A1* | 4/2013 | Chen | G06Q 10/06 |
| | | | 705/5 |
| 2016/0240009 A1* | 8/2016 | Lyren | H04N 13/398 |
| 2018/0033279 A1* | 2/2018 | Chong | G06Q 10/0633 |
| 2018/0137461 A1* | 5/2018 | Wilkinson | G06Q 10/0836 |
| 2019/0139002 A1* | 5/2019 | Kumar | G06Q 10/1095 |
| 2020/0160243 A1 | 5/2020 | Tomosugi | |
| 2020/0379420 A1* | 12/2020 | Gupta | G05B 15/02 |
| 2020/0394568 A1* | 12/2020 | Chuaypradit | G06Q 10/02 |
| 2021/0133638 A1* | 5/2021 | Wang | G06Q 10/02 |
| 2021/0150423 A1 | 5/2021 | Tomosugi et al. | |
| 2021/0390515 A1 | 12/2021 | Tomosugi | |
| 2022/0076180 A1 | 3/2022 | Tomosugi | |

\* cited by examiner

FIG. 5

| ATTRIBUTE NAME | DISPLAY COLOR |
|---|---|
| CONCENTRATION ZONE | RED |
| COLLABORATION ZONE | BLUE |
| REMOTE MEETING ZONE | GREEN |
| ... | ... |

FIG. 6A

| SEAT ID | COORDINATE | SEAT MAP |
|---|---|---|
| 001 | (X1, Y1) | MAP.JPEG |
| 002 | (X2, Y2) | |
| 003 | (X3, Y3) | |
| ... | ... | ... |

FIG. 6B

| SEAT ID | ATTRIBUTE | FLOOR NAME | FLOOR NUMBER | LOCATION |
|---|---|---|---|---|
| 001 | CONCENTRATION ZONE | BUILDING A FLOOR 1 | 1 | TOKYO OFFICE |
| 002 | COLLABORATION ZONE | BUILDING A FLOOR 1 | 1 | TOKYO OFFICE |
| 003 | REMOTE MEETING ZONE COLLABORATION ZONE | BUILDING A FLOOR 1 | 1 | TOKYO OFFICE |
| ... | ... | ... | ... | ... |

FIG. 7

| RESERVATION ID | SEAT ID | RESERVATION START DATE AND TIME | RESERVATION END DATE AND TIME | USER ID | ACTUAL USAGE |
|---|---|---|---|---|---|
| R001 | 001 | 03/10/20XX 9:00 | 03/10/20XX 17:00 | U001 | 03/10/20XX 8:50 – 17:00 |
| R002 | 002 | 03/10/20XX 9:00 | 03/10/20XX 17:00 | U002 | 03/10/20XX 8:55 – 17:30 |
| R003 | 003 | 03/10/20XX 9:00 | 03/10/20XX 17:00 | U003 | 03/10/20XX 8:45 – 17:10 |
| ... | ... | ... | ... | ... | ... |

FIG. 8

| USER ID | MEMBER | MEMBER | MEMBER | ... |
|---|---|---|---|---|
| U001 | U002 | U003 | | |
| U002 | U003 | U005 | U011 | |
| ... | ... | ... | ... | ... |

FIG. 9

| Seat Management Application | Home | Floor List | Seat List | Area List | Usage History | Settings | | |
|---|---|---|---|---|---|---|---|---|
| Floor List | | | | | | +Create New | | |
| Floor Name | Location | | Floor Number | | | | | |
| Building A Floor 1 | Tokyo Office | | 1 | | Map | Edit | Delete | |
| Building A Floor 2 | Tokyo Office | | 2 | | Map | Edit | Delete | |
| Building A Floor 3 | Tokyo Office | | 3 | | Map | Edit | Delete | |

FIG. 19

Seat Reservation Application

| 211 | 212 | 274 | 215 | 216 |
|---|---|---|---|---|
| Home | Floor List | Seat Search | Usage History | Settings |

280

Seat Search

Date*
281 — 06/01/2022 (Wed)

Start Time*
282 — 09:00

End Time*
283 — 18:00

Floor*
284 — Building A Floor 1 ▽

Attribute
285 — Concentration Zone ✕ ▽
Concentration Zone
Collaboration Zone
Remote Meeting Zone 286 — Search

FIG. 20

| Seat Reservation Application | Home 211 | Floor List 212 | Seat Search 274 | Usage History 215 | Settings 216 | | | 290 |
|---|---|---|---|---|---|---|---|---|

Seat Search

Date *
281  06/01/2022 (Wed)

Start Time *
282  09:00

End Time *
283  18:00

Floor *
284  Building A Floor 1  ▽

Attribute
285  Concentration Zone  × ▽

286  [Search]

Search Result

| Seat Number 288 | Floor 289 | Available Time 292 | 291 |
|---|---|---|---|
| 001 | Building A Floor 1 | 09:00 – 23:59 | [Reservation] |
| 002 | Building A Floor 1 | 09:00 – 23:59 | [Reservation] |
| 004 | Building A Floor 1 | 09:00 – 23:59 | [Reservation] |
| 005 | Building A Floor 1 | 09:00 – 23:59 | [Reservation] |

| Seat Reservation Application | Home | Floor List | Seat Search | Usage History | Settings |
|---|---|---|---|---|---|
| | 211 | 212 | 274 | 215 | 216 |

270

271 — Reservation Status

301~015  Tokyo Office  Building A Floor 1  06/01 (Wed) 08:58 – 12:00  [In Use]  [Change Time] [End Use]

018  Tokyo Office  Building A Floor 1  06/01 (Wed) 13:58 – 17:30  [Reserved]  [Start Use] [Change Time] [Cancel Reservation]

015  Tokyo Office  Building A Floor 1  06/02 (Thu) 09:00 – 17:30  [Reserved]  [Change Time] [Cancel Reservation]

Recently Used Floor and Usage Rate ~272
Building A Floor 1            30% ( 30/100)
Building A Floor 2            40% ( 20/50)
Building A Floor 3 Free Zone  80% ( 80/100)

Today's Member Attendance Status (Edit by Member) ~273
Mick   Tokyo Office  Building A Floor 1  099  09:00 – 17:30 [In Use]
Keith  No Attendance Today

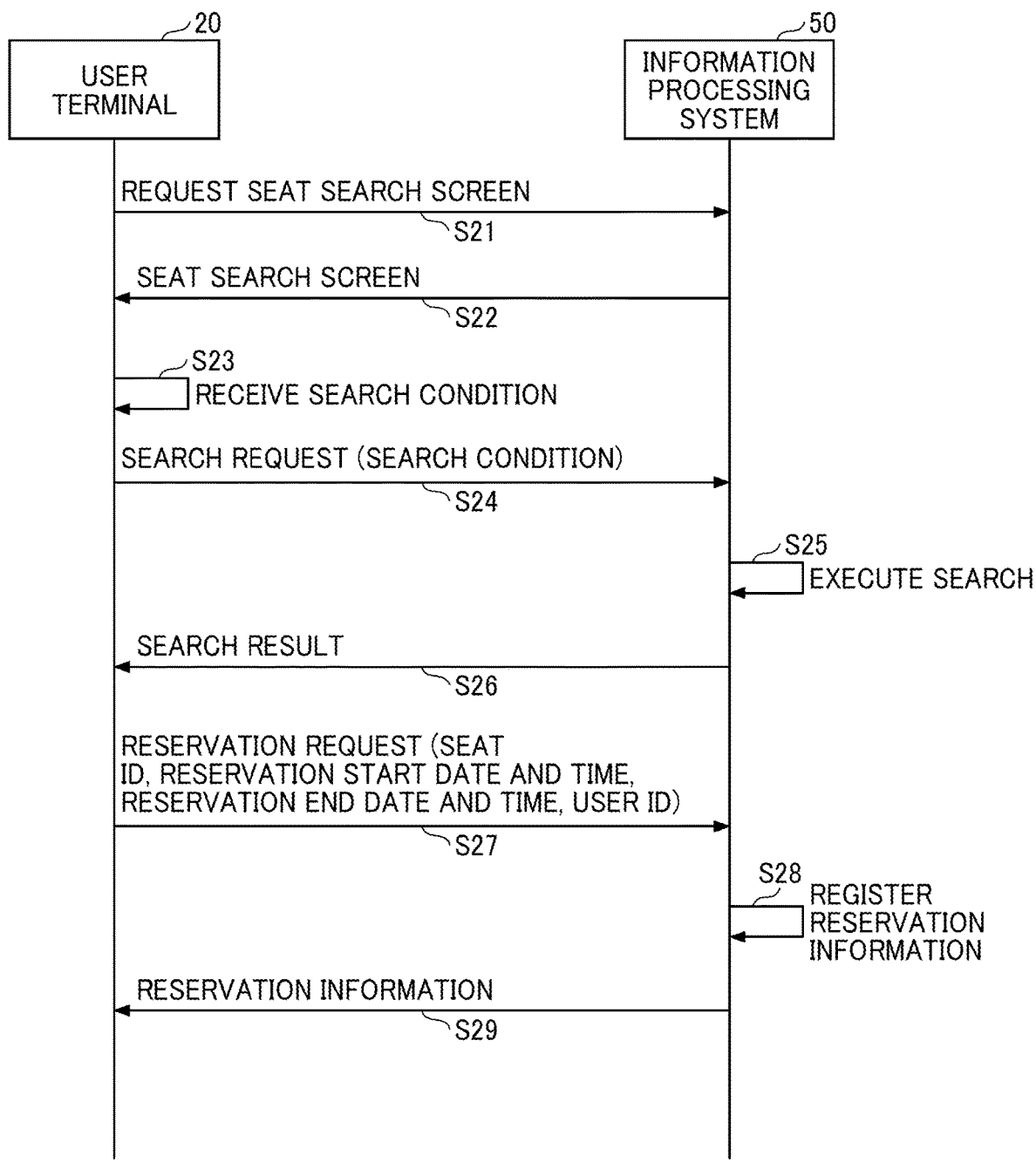

FIG. 24

Seat Reservation Application

211 Home  212 Floor List  274 Seat Search  215 Usage History  216 Settings

330

Seat Search

Date*
331 06/01/2022 (Wed)
Start Time*
332 09:00
End Time*
333 18:00
Floor*
334 Building A Floor 1
Attribute
335 Concentration Zone 336 OK    337 Cancel

INFORMATION PROCESSING SYSTEM, NON-TRANSITORY RECORDING MEDIUM, AND ATTRIBUTE SETTING METHOD

CROSS-REFERENCE TO RELATED APPLICATIONS

This patent application is based on and claims priority pursuant to 35 U.S.C. § 119(a) to Japanese Patent Application No. 2022-100268, filed on Jun. 22, 2022, and No. 2023-003153 filed on Jan. 12, 2023, in the Japan Patent Office, the entire disclosure of which is hereby incorporated by reference herein.

BACKGROUND

Technical Field

The present disclosure relates to an information processing system, a non-transitory recording medium, and an attribute setting method.

Background Art

An increasing number of companies and local governments are adopting free address systems in which employees can work from preferred seats using laptop computers and the like, rather than having a fixed seat in an office. Seat users, such as the employees who have come to work, can start work using a favorite seat, locker, desk, booth, or other equipment.

A known technique prevents the free address system from becoming a mere skeleton by gradually fixing the seats used by the seat users who came to work. A technique is disclosed to randomly select a seat to be assigned to the seat user from currently vacant seats in response to a request for use of the seat from the seat user.

SUMMARY

Embodiments of the present disclosure describe an information processing system, a non-transitory recording medium, and an attribute setting method. The information processing system receives area information for designating equipment and attribute information indicating attribute to be set to the equipment, the area information and the attribute information being set at a first terminal device communicably connected to the information processing system through a network, and stores in one or more memories, the attribute information in association with the equipment designated by the area information.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a table illustrating an example of attribute information stored in an attribute information storage unit;

FIGS. 6A and 6B are tables illustrating examples of seat position information and seat information stored in the seat information storage unit;

FIG. 7 is a table illustrating an example of reservation information stored in a reservation information storage unit;

FIG. 8 is a table illustrating an example of member information stored in a member information storage unit;

FIG. 9 is a diagram illustrating an example of a floor list screen displayed by the administrator terminal;

FIG. 19 is a diagram illustrating an example of a seat search screen displayed on the user terminal;

FIG. 20 is a diagram illustrating an example of a search result screen on which search result is displayed by pressing a search button;

FIG. 21 is a diagram illustrating an example of the seat availability screen displayed by the user terminal after making a reservation;

FIG. 22 is a sequence diagram illustrating an example of a process in which the user terminal communicates with the information processing system and the information processing system receives the reservation;

FIG. 24 is a diagram illustrating an example of a use start screen displayed by the user terminal;

Figure 1:
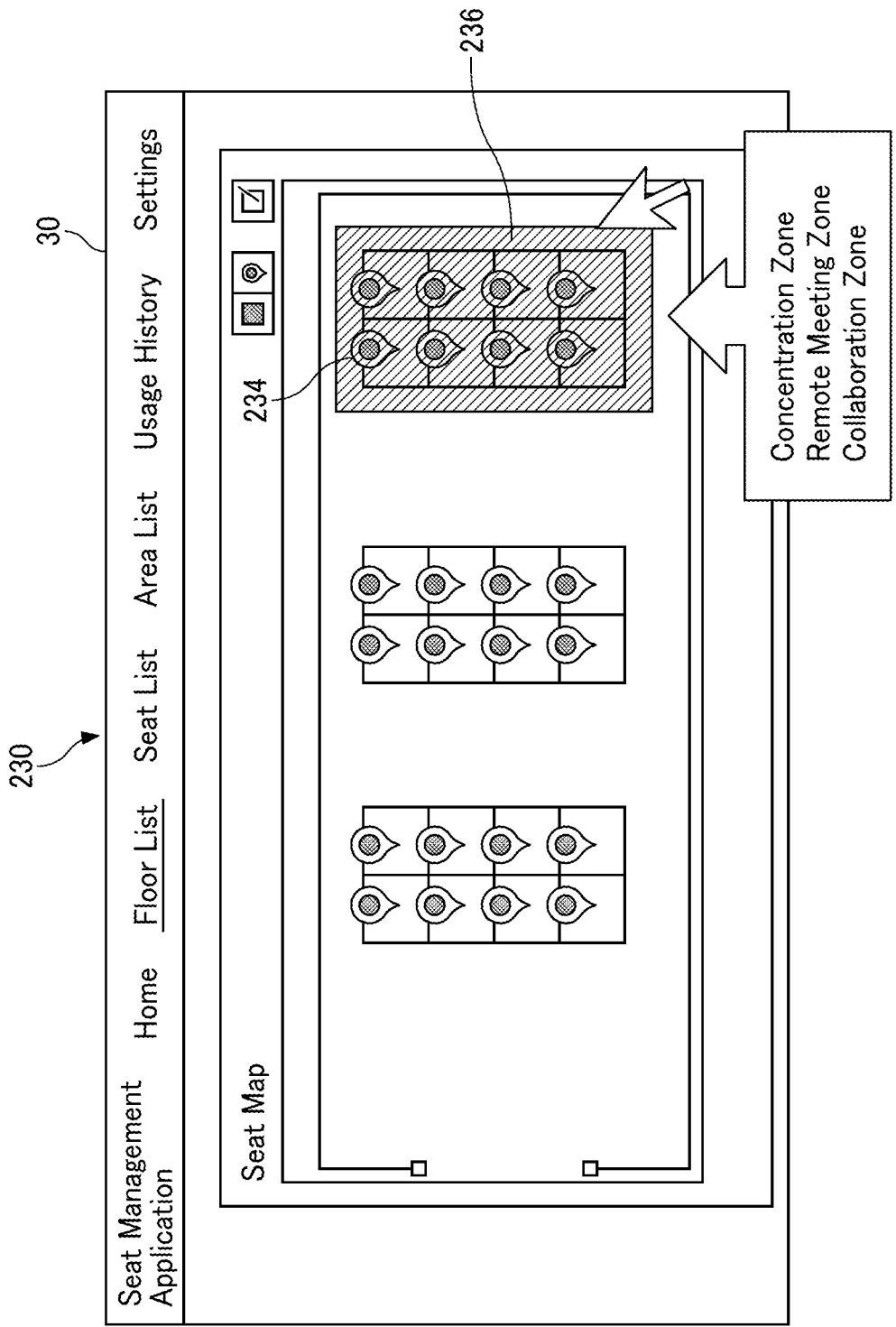
FIG. 1 is a diagram illustrating an outline of example operation performed by an administrator to register an attribute for a seat in a company on an administrator terminal.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an information processing system and an attribute setting method performed by the information processing system are described as an example of embodiment for carrying out the present disclosure, with reference to the drawings.

With reference to FIG. 1, an outline of a process of registering an attribute to a seat by the information processing system of the present embodiment is described. FIG. 1 is a diagram illustrating the outline of operation performed by an administrator to register the attribute to the seat in an office using an administrator terminal 30.

The administrator creates a seat map of the office in advance and stores the seat map in the information processing system described below. The administrator terminal 30 acquires a seat position registration screen 230 including the seat map from the information processing system 50 and displays the seat position registration screen 230. In FIG. 1, pin icons 234 represent seats. A layout of the pin icon 234 can be set by the administrator. Three groups of seats are displayed on the seat map. The seat map may vary depending on the office of a company or a local government.

To register the attribute for a seat, the administrator designates the seat for which the attribute is to be registered using a pointing device such as a mouse. In FIG. 1, eight seats are selected in an area 236 (an example of area information) by dragging the pointing device. A display color of the dragged area 236 is different from that of the other areas. The administrator registers the attribute for the selected seats in the area 236 using menus provided. Examples of the attributes include a concentration zone, a remote meeting zone, and a collaboration zone. The attribute set by the administrator is associated with each seat in the area 236. A seat user reserves a seat by searching for an available seat by designating the attribute.

The administrator is able to collectively register the attribute for a plurality of seats by designating the area 236 on the seat map. The seat user is able to use the seat suitable for workstyle and purpose. For example, a seat user planning to concentrate on work can reserve a seat in the concentration zone in advance or use the seat in the concentration zone, so the seat user can concentrate without being disturbed by surrounding sounds of the remote meetings.

In addition, the administrator can efficiently change the layout of the office by obtaining a utilization rate for each attribute of the seat. For example, in the case the utilization rate of the concentration zone is high, the concentration zone may be expanded or the number of seats may be increased. Accordingly, demand of the seat users are reflected.

The "attribute" of equipment is information indicating how the equipment is used. The attribute may also be referred to as a purpose of use. In the present embodiment, the attributes of the seats include the concentration zone, the remote meeting zone, the collaboration zone, and the like. Further, the attributes may include location information (such as a building A, a west floor, a fifth floor, and the like,) a sleeping zone, a telephone zone, a personal computer (PC) input zone, and the like. The attributes may vary from equipment to equipment.

The "equipment" refers to any resource owned, rented, or managed by a school, a company, a group, an organization, or the like. The equipment includes, for example, a seat, a locker, a seat in moving body, a toilet, a desk, a booth, a PC, an electronic whiteboard, a projector, an image forming device, and the like. In the present embodiment, for convenience of explanation, the "seat" is used as an example of the equipment. Further, some equipment move less frequently and are exclusively used for a certain period of time.

In the case of the locker, the attributes are men's, women's, large, small, with lock, without key, and the like. A "moving body" is a train, a bus, an airplane, a ship, or the like. In the case of a seat in the moving body, the attributes are grade, whether or not to rotate, non-smoking or smoking, and the like. In the case of the toilet, the attributes are men's, women's, multi-purpose, western style, Japanese style, and the like. In the case of the desk and booth, the attributes are size, type of lighting, and presence or absence of optional items such as a PC. In the case of the electronic whiteboard, the projector, and the image forming apparatus, the attributes are functions possessed by each device.

In addition, the equipment may be a conference room, a room of an accommodation facility, a rental space, and the like. In the case the conference room, each room of the accommodation facility, and the rental space are provided together, the administrator can register the attribute by designating an area. The attributes of the conference room, the room of accommodation facility, and the rental space include sizes such as large, medium, and small, non-smoking or smoking, and presence or absence of optional items such as a printer.

A "space" is a place continuously used for living, for work, for an assembly, for entertainment and other similar purposes. For example, the space includes an office, a meeting room, a factory workshop, a hospital sick room, a waiting room, an examination room, a library, a restaurant seating, a product sales floor, an exhibition hall, a seminar hall, a hotel lobby, and the like. Further, the space includes an outdoor space such as a rooftop or an event venue. In the present embodiment, the office is used as an example of the space.

Figure 2:
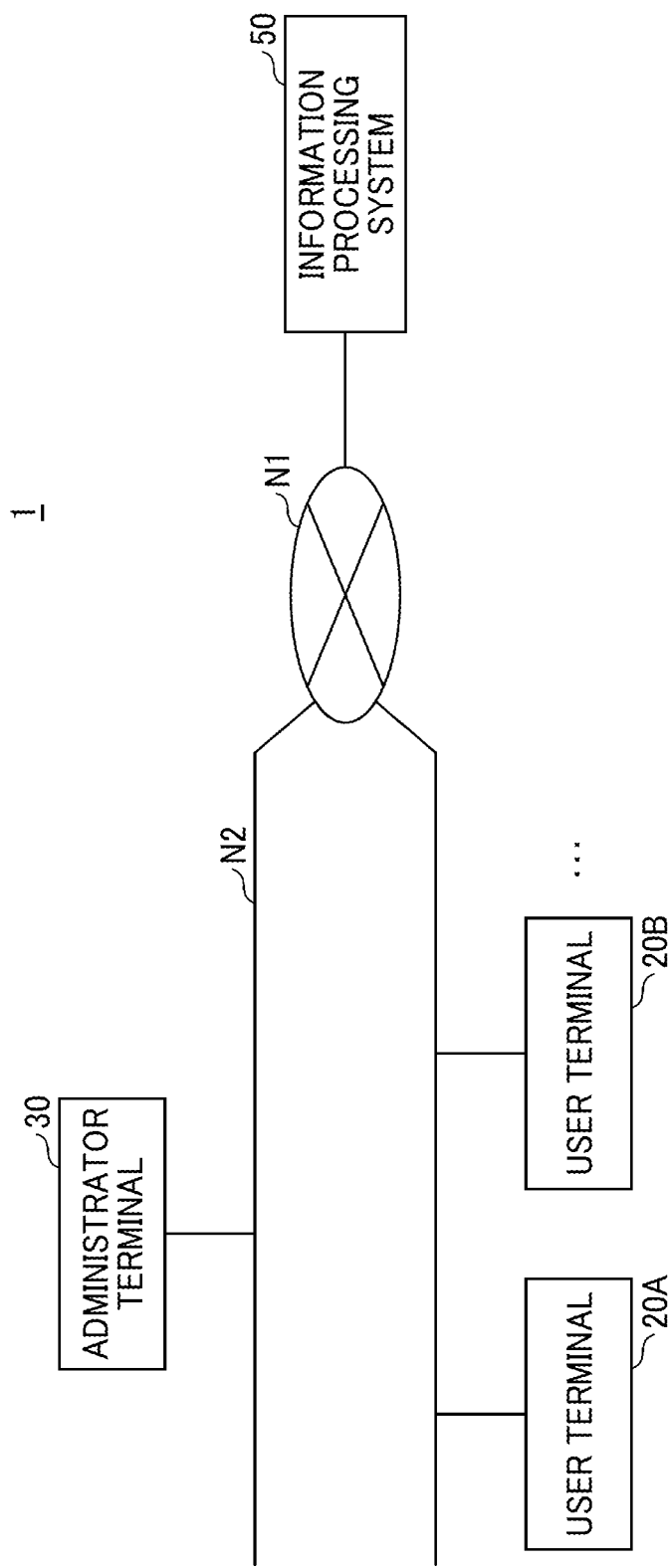
FIG. 2 is a diagram illustrating a system configuration of an example of an equipment utilization system.

With reference to FIG. 2, a system configuration of the equipment utilization system 1 according to the present embodiment is described. FIG. 2 is a diagram illustrating an example of the system configuration of the equipment utilization system 1 according to the present embodiment.

The equipment utilization system 1 illustrated in FIG. 2 includes an information processing system 50, an administrator terminal 30 (an example of a first terminal device), and a user terminal 20 (an example of a second terminal device), and is communicably connected through a wide-area network N1 such as the internet or the like and an intra-facility network N2.

The information processing system 50 is implemented by one or more information processing apparatuses and is connected to the network N1. The information processing system 50 manages free-address seats in the company and the local government. Specifically, the information processing system 50 reserves seats, records usage, and receives registration of seat attribute.

The information processing system 50 may be implemented by cloud computing or may be implemented by a single information processing apparatus. The cloud computing refers to a usage pattern in which resources on the network are used without being aware of specific hardware resources. The information processing system 50 may reside on the internet or may reside on the premises of the company or the local government.

The information processing system 50 provides web application to the administrator terminal 30 and the user terminals 20. A web application is at least one of a program that runs on the web server and a program that runs on the web browser, in an interaction between the web server and a client such as the web browser. For example, a program running on the web browser and on the web server performs processing according to an operation by the user on the web browser, and returns a result to the user. In contrast to the web application, an application installed and used on the terminal is called a native application.

The information processing system 50 may communicate with an authentication server that authenticates an employee, or the information processing system 50 may include the function of the authentication server. The information processing system 50 can identify which employee is the seat user based on successful authentication.

The administrator terminal 30 is, for example, an information processing terminal used by an administrator who manages a free address system of the company or the local government. The administrator terminal 30 is a desktop PC, notebook PC, smart phone, tablet terminal, or the like. The administrator terminal 30 is not limited to these terminals as long as the web browser can be operated. The administrator terminal 30 is connected to the network N2. The network N2 is a local area network (LAN), a wireless LAN, a wide area network (WAN), or a wide area Ethernet (registered trademark) installed within the company or the local government.

The administrator operates the administrator terminal 30 and uses various services provided by the information processing system 50. For example, the administrator connects the administrator terminal 30 to the information processing system 50 and registers the attribute for the seat. Although one administrator terminal 30 is illustrated in FIG. 2, a plurality of administrator terminals 30 may be provided.

The user terminal 20 is, for example, an information processing terminal used by the employee of the company or the local government. The user terminal 20 is the desktop PC, notebook PC, smart phone, tablet terminal, or the like. The user terminal 20 is not limited to these terminals as long as the web browser can be operated. The user terminal 20 is connected to the network N2. The user terminal 20 and the administrator terminal 30 may be the same (when the administrator is the seat user).

In the following description, when distinguishing between a plurality of user terminals 20, the user terminals are described using suffixes such as "user terminal 20A" and "user terminal 20B".

Devices such as the image forming apparatus, the electronic whiteboard, and the projector may be connected to the network N2 of the company or the local government. Depending on the seat, there are seats that are easy to use these devices and seats that are not.

Figure 3:
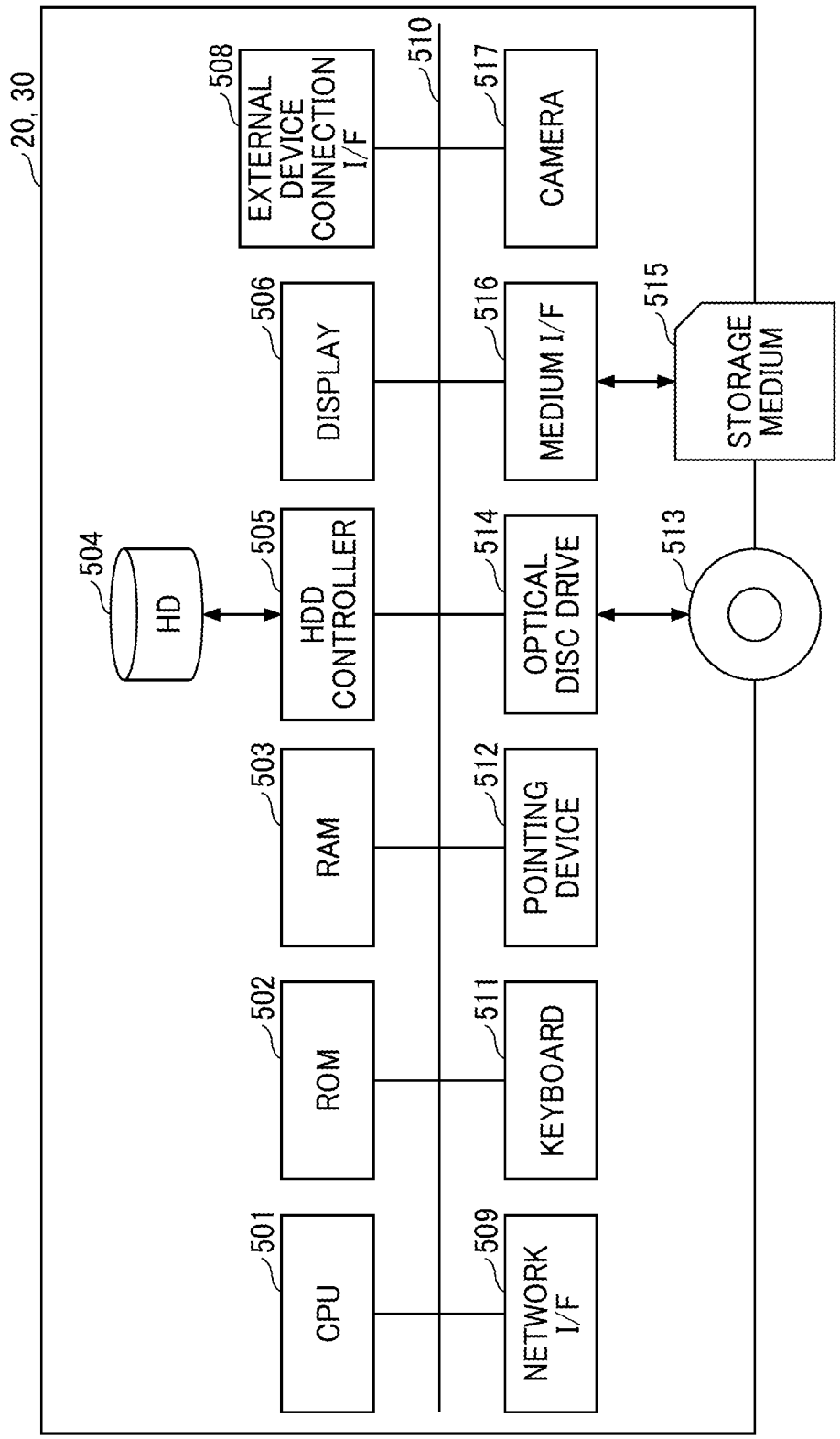
FIG. 3 is a diagram illustrating a hardware configuration of examples of an information processing system, an administrator terminal, and a user terminal.

With reference to FIG. 3, hardware configurations of the information processing system 50, the administrator terminal 30, and the user terminal 20 included in the equipment utilization system 1 according to the present embodiment are described.

FIG. 3 is a block diagram illustrating the hardware configuration of examples of the information processing system 50, the administrator terminal 30, and the user terminal 20 according to the present embodiment. As illustrated in FIG. 3, the information processing system 50, the administrator terminal 30, and the user terminal 20 are implemented by computers and include a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical disc drive 514, a medium I/F 516 and a camera 517.

Among these elements, the CPU 501 controls entire operation of the computer 500. The ROM 502 stores a control program such as an initial program loader (IPL) to boot the CPU 501. The RAM 503 is used as a work area for the CPU 501. The HD 504 stores various data such as programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a Universal Serial Bus (USB) memory or a printer.

The network I/F 509 is an interface for performing data communication using the network N2. The bus line 510 is an address bus, a data bus, or the like for electrically connecting each component such as the CPU 501 illustrated in FIG. 3.

The keyboard 511 is an example of input device including a plurality of keys used for inputting characters, numerical values, various instructions, and the like. The pointing device 512 is an example of the input device that allows a user to select or execute a specific instruction, select a target for processing, or move a cursor being displayed. The optical disc drive 514 reads and writes various data from and to a Digital Versatile Disc-Rewritable (DVD-RW) 513, which is an example of a removable storage medium. The removable storage medium may be a Compact Disc (CD), Digital Versatile Disc (DVD), BLU-RAY (registered trademark), or the like. The medium I/F 516 controls reading and writing (storing) of data from and to a storage medium 515 such as a flash memory. The camera 517 records light input to an imaging element through a lens as image data.

Figure 4:
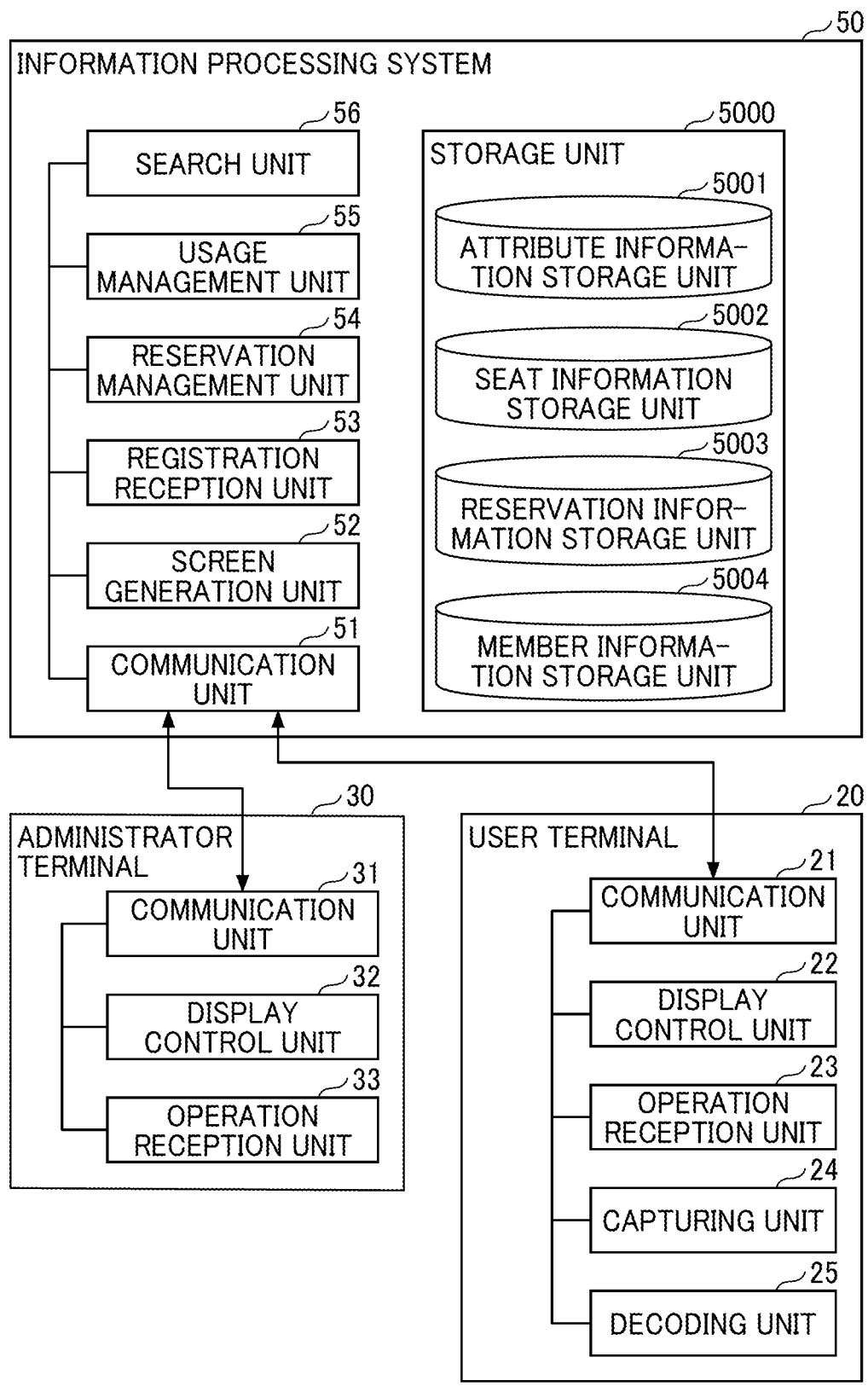
FIG. 4 is a diagram illustrating an example of a functional configuration of an information processing system, an administrator terminal, and a user terminal included in the equipment utilization system.

With reference to FIG. 4, a functional configuration of the equipment utilization system 1 according to the present embodiment is described. FIG. 4 is a diagram illustrating an example of the functional configuration of the equipment utilization system 1 according to the present embodiment.

The administrator terminal 30 includes a communication unit 31, a display control unit 32 and an operation reception unit 33. Each of these functional units is implemented by the CPU 501 executing an instruction included in one or more programs installed in the administrator terminal 30. This program may be the web browser or a dedicated native application.

The communication unit 31 (an example of a second communication unit) transmits and receives various information to and from the information processing system 50. In the present embodiment, the communication unit 31 receives various screen information and the like for registering the attribute of seat from the information processing system 50 and transmits information input on the screen by the administrator to the information processing system 50.

The display control unit 32 interprets the screen information of various screens and displays screens on the display 506.

The operation reception unit 33 receives various operations performed by the administrator on the various screens displayed on the display 506.

The user terminal 20 includes a communication unit 21, a display control unit 22, an operation reception unit 23, a capturing unit 24 and a decoding unit 25. Each of these functional units is a function implemented by the CPU 501 executing instructions included in one or more programs installed in the user terminal 20. The one or more programs may be the web browser or the dedicated native application.

The communication unit 21 transmits and receives various information to and from the information processing system 50. In the present embodiment, the communication unit 21 receives various screen information for seat reservation from the information processing system 50 and transmits information input by the seat user to the information processing system 50. The communication unit 21 also transmits a request to start using the seat, a request to end using the seat, and the like to the information processing system 50.

The display control unit 22 interprets the screen information of various screens and displays the screens on the display 506.

The operation reception unit 23 receives various operations performed by the seat user on the various screens displayed on the display 506.

The capturing unit 24 captures an image of coded information (such as a bar code attached to a seat, which is described below) with the camera of the user terminal according to a user operation.

The decoding unit 25 determines whether the image captured by the capturing unit 24 contains coded information, and decodes the image in case the coded information is included.

The information processing system 50 includes a communication unit 51, a screen generation unit 52, a registration reception unit 53, a reservation management unit 54, a usage management unit 55 and a search unit 56. Each functional unit of the information processing system 50 is a function implemented by the CPU 501 executing instructions included in one or more programs installed in the information processing system 50.

The information processing system 50 further includes a storage unit 5000 implemented by the HD 504, the RAM 503, or the like illustrated in FIG. 3. In the storage unit 5000, an attribute information storage unit 5001, a seat information storage unit 5002, a reservation information storage unit 5003, and a member information storage unit 5004 are included. Each of these storage units may be included in the information processing system 50 or on a network to which the information processing system 50 is connected.

The communication unit 51 transmits and receives various information to and from the administrator terminal 30 and the user terminal 20. In the present embodiment, the communication unit 51 transmits various screen information to the administrator terminal 30 and the user terminals 20 and receives information input in the administrator terminal 30 and the user terminal 20.

The screen generation unit 52 generates various screen information displayed by the administrator terminal 30 and the user terminal 20. In response to execution of the web application by the administrator terminal 30 or the user terminal 20, the screen information is created using Hypertext Markup Language (HTML), Extensible Markup Language (XML), Cascade Style Sheet (CSS), JAVASCRIPT (registered trademark), and the like. The administrator terminal 30 or the user terminal 20 may execute the native application, and in this case, the native application has the configuration of the screen. The screen generation unit 52 generates information to be displayed by the native application.

The registration reception unit 53 receives registration of the attributes for one or more seats from the administrator terminal 30. The attributes are, for example, the concentration zone, the remote meeting zone, and the collaboration zone. The registration reception unit 53 can collectively receive registration of the attributes for a plurality of seats.

The reservation management unit 54 receives reservation of the seat from the user terminal 20 and stores reservation information in the reservation information storage unit 5003 while eliminating duplicate reservation for the same seat in the same time slot.

The seat user may use the seat without reservation as long as the seat is not reserved or occupied.

The usage management unit 55 manages a start and end of use of the seat. As described below in detail, the seat user reads the coded information with the user terminal 20 and transmits a use start request to the information processing system 50. The usage management unit 55 receives the use start of the seat based on the use start request, and stores the use start of the seat in the reservation information storage unit 5003. Similarly, the usage management unit 55 receives the end of use of the seat based on the use end request, and stores the end of use of the seat in the reservation information storage unit 5003.

The search unit 56 searches for a seat that matches search conditions (attribute, time zone, location, etc.) sent from the user terminal 20.

FIG. 5 is a table illustrating an example of attribute information stored in the attribute information storage unit 5001. As illustrated in FIG. 5, the attribute information storage unit 5001 stores attribute information of the equipment and in the present embodiment, as an example, stores information related to the attribute that can be registered for the seat. The administrator is allowed to edit the attribute information.

An "attribute name" is a name of the attribute registered for the seat. Any name to describe the attribute can be assigned by the administrator as the attribute name.

A "display color" is the color of the area assigned by the administrator by operating the administrator terminal 30 and selecting the seat for which the attribute is to be registered. The display color facilitates the administrator to determine the attribute registered for each seat.

FIG. 6A is a table illustrating an example of seat position information stored in the seat information storage unit 5002.

As illustrated in FIG. 6A, the seat position information includes a seat identifier (ID), coordinates of the seat, a seat map in which the seat is illustrated, and the like.

The "seat ID" is an example of identification information for uniquely identifying the seat. In response to the administrator placing the pin icon (described below) on the seat in the seat map, the registration reception unit 53 sets the seat ID that does not overlap.

The coordinate is position information of each seat on the seat map. Specifically, the position information of each seat is the location of pin icon placed on the seat map. Origin of the coordinates is, for example, the upper left corner of the seat map. These coordinates are used to determine the seats included in the area when the area is designated on the seat map.

The "seat map" is image data representing a layout image of the seats in the office.

The seat map is created in advance by a person in charge (for example, the administrator) of the company or the local government. The seat map does not include the seat position information, and position of the seat is determined by the pin icon.

FIG. 6B is a table illustrating an example of seat information stored in the seat information storage unit 5002. As illustrated in FIG. 6B, the seat information includes the attribute, floor name, floor number, location, and the like in association with the seat ID.

The "seat ID" is the same as that of the seat position information.

The "attribute" indicates the attribute registered for the seat. As illustrated in the seat information with the seat ID "003", a plurality of attributes may be set for one seat.

The "floor name" is the name of the floor where the seat is provided. Any name can be assigned by the administrator as the floor name.

The "floor number" is the floor number where the seat is provided. The administrator sets the floor number.

The "location" is information indicating the location of the seat. Any information can be assigned by the administrator as the location.

FIG. 7 is a table illustrating an example of reservation information stored in the reservation information storage unit 5003. As illustrated in FIG. 7, the reservation information includes the seat ID, a reservation start date and time, a reservation end date and time, the user ID, a usage history, and the like in association with the reservation ID.

The "reservation ID" is the identification information for identifying the reservation information. The reservation management unit 54 assigns (numbers) a unique reservation ID.

The "seat ID" is the same as that of the seat position information.

The "reservation start date and time" is the start time of the seat reservation.

The "reservation end date and time" is the end time of the seat reservation.

The "user ID" is the identification information of the seat user. The user ID of the seat user who reserved the seat is set as the user ID. When the seat user uses the seat without making a reservation (actually, the reservation is made just before the start of use), the user ID of the seat user who is going to use the seat is set.

FIG. 8 is a table illustrating an example of member information stored in the member information storage unit 5004. As illustrated in FIG. 8, one or more members are registered in association with user ID in the member information. The members are seat users in the same department, seat users in the same group, and the like. Each user is allowed to edit the member information.

The user ID is the identification information of the seat user.

The "member" is the identification information of the seat user registered by the seat user or registered automatically. The member is displayed in a today's member attendance status field of a seat availability screen 270, which is described below.

With reference to FIGS. 9 to 16, screens displayed by the administrator terminal 30 are described in the following. FIG. 9 is a diagram illustrating an example of a floor list screen 200 displayed by the administrator terminal 30. The floor list screen 200 is a screen for the administrator to create new floor information and edit the floor information.

A floor name 201 is the name of the floor with free-address seats provided. Any name can be given by the administrator as the floor name.

A location 202 is the name of the office or the like, where the above floor is located. Any name can be given by the administrator as the location.

A floor number 203 is the floor number of the above floor. Any number can be given by the administrator as the floor number.

A map button 204 is a button for displaying the seat map associated with the floor name.

An edit button 205 is a button for receiving editing of the floor name, location, floor number, seat map, and the like.

A delete button 206 is a button for receiving deletion of one line of information on the floor list screen 200.

A create new button 207 is a button for the administrator to newly register a floor name, location, floor number, seat map, and the like.

Figure 18:
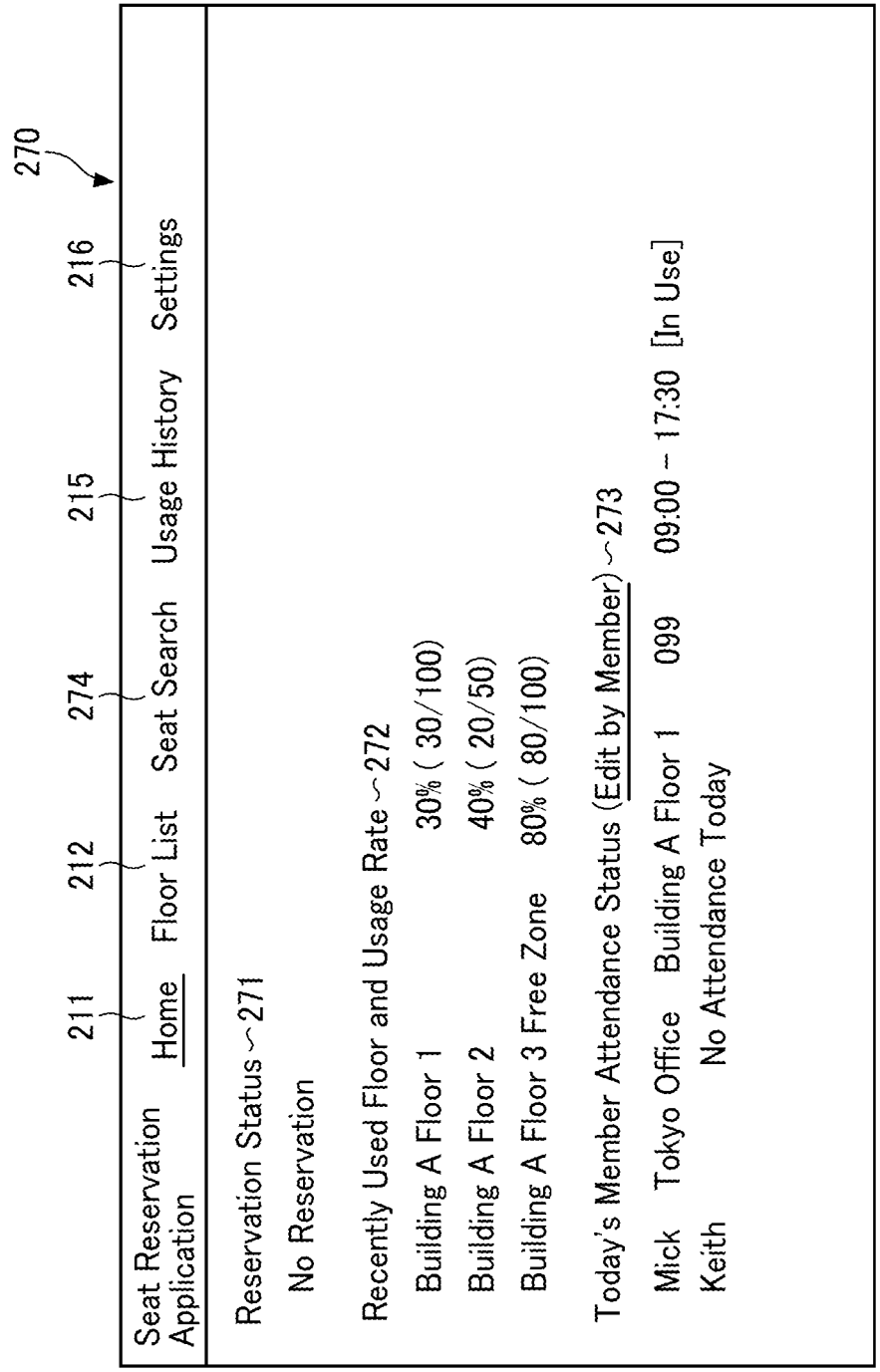
FIG. 18 is a diagram illustrating an example of a seat availability screen displayed on the user terminal.

A home tab 211 is a tab for displaying the seat availability screen 270 of FIG. 18. A floor list tab 212 is a tab for displaying the floor list screen 200 of FIG. 9. A seat list tab 213 is a tab for displaying the positions of registered seats. An area list tab 214 is a tab for displaying a list of registered attributes. A usage history tab 215 is a tab for displaying a detailed past usage history of seats. A settings tab 216 is a tab for making various settings.

Figure 10:
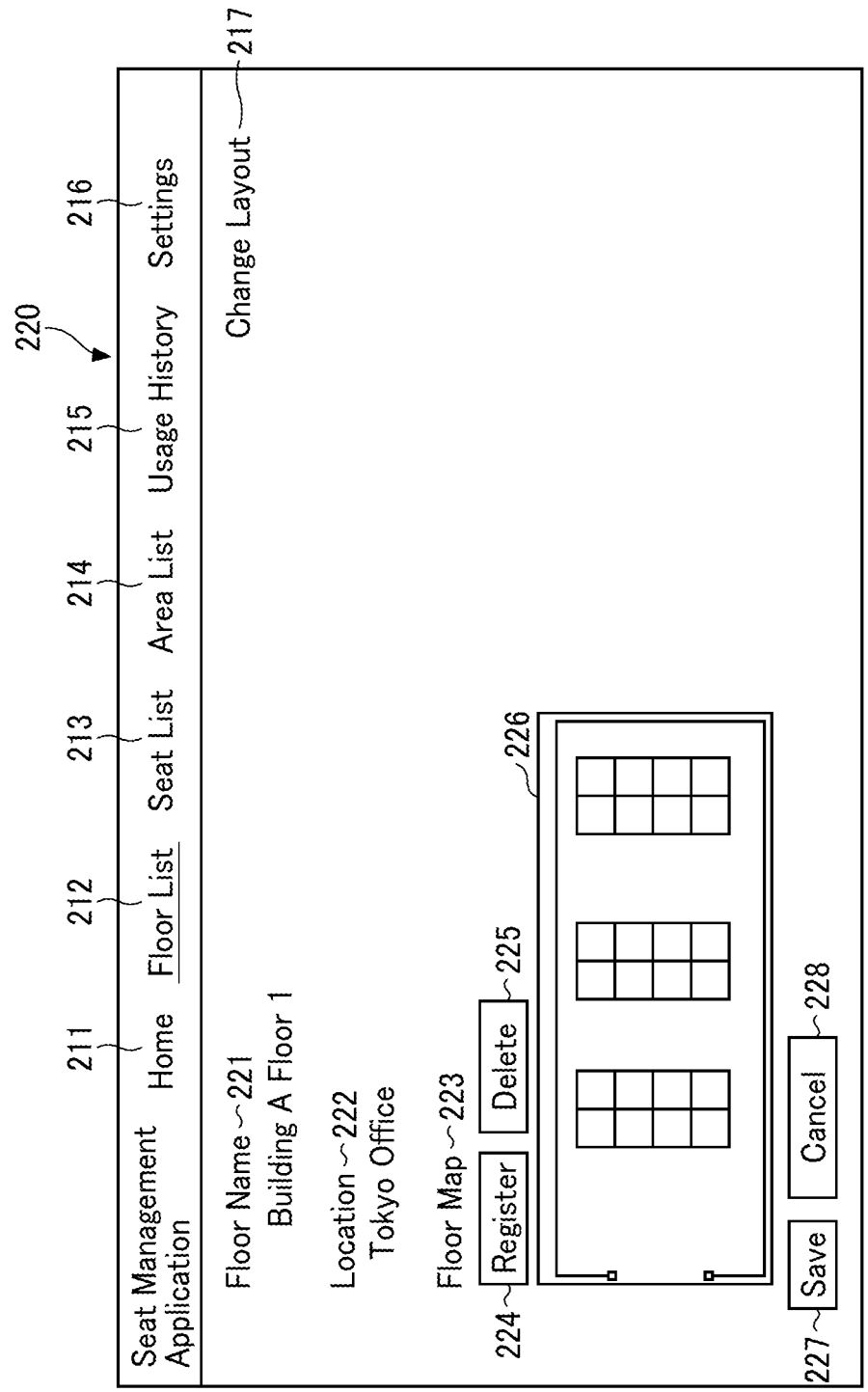
FIG. 10 is a diagram illustrating an example of a floor management screen displayed by the administrator terminal.

FIG. 10 is a diagram illustrating an example of the floor management screen 220 displayed by the administrator terminal 30. The floor management screen 220 is displayed in response to the administrator pressing the create new button 207 or the edit button 205 in FIG. 9. The floor management screen 220 is a screen for receiving editing of the floor name, location, floor number, seat map, and the like. The floor management screen 220 includes a floor name field 221, a location field 222 and a floor map field 223. The administrator is allowed to edit the floor name in the floor name field 221 and to edit the location name in the location field 222.

In response to the administrator pressing the register button 224, a dialog for selecting the seat map is displayed. The administrator selects the seat map created in advance and displays the seat map in the floor map field 223. The seat map 226 selected by the administrator is displayed in the floor map field 223. The seat map 226 that has already been registered may be deleted by the administrator by pressing the delete button 225.

In response to the administrator pressing the save button 227, the floor name, location, floor number, seat map, and the like are transmitted to the information processing system 50. In response to the administrator pressing the cancel button 228, the floor name, location, floor number, seat map, and the like are discarded without being sent to the information processing system 50.

In the case the areas and attributes are set in the seat map, the areas may be displayed in the display color corresponding to the attributes in the floor map field 223.

Figure 11:
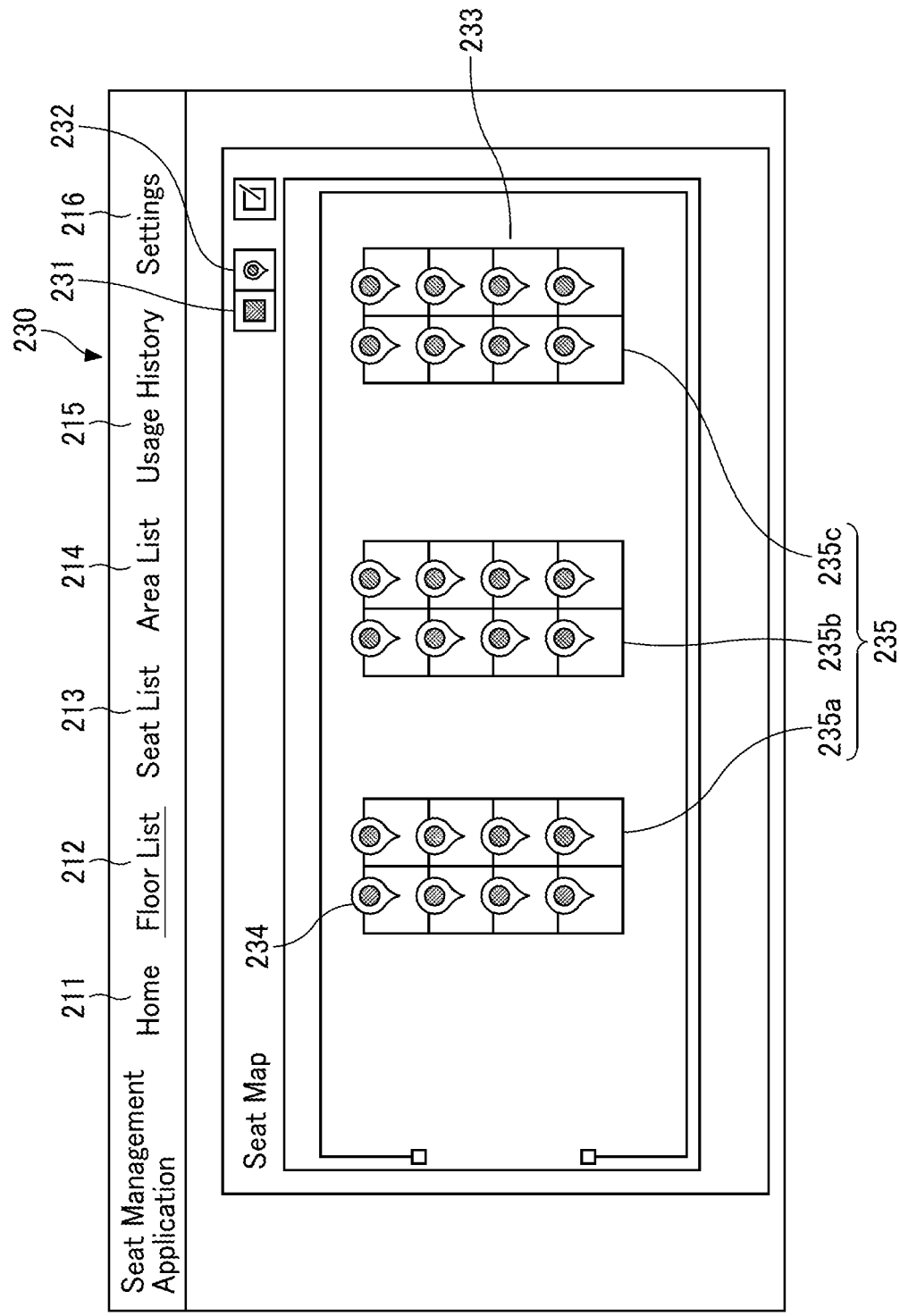
FIG. 11 is a diagram illustrating an example of a seat position registration screen displayed by the administrator terminal.

The administrator registers the seat position in the seat map registered in FIG. 10. The administrator presses the seat list tab 213. FIG. 11 is a diagram illustrating an example of a seat position registration screen 230 displayed by the administrator terminal 30. The seat position registration screen 230 is a screen for registering seat position on the seat map and registering the attribute for each seat by designating the area. The seat position registration screen 230 can be displayed by pressing the layout change button 217 on the floor management screen 220 in FIG. 10.

The seat position registration screen 230 includes an area designation button 231, a pin icon button 232 and a seat map field 233. In response to the administrator pressing the pin icon button 232, a pin icon 234 appears. The administrator can move the pin icon 234 that has appeared. The pin icon 234 indicates an available seat. The administrator drops the pin icon 234 on the seat that the administrator wants the seat users to use. The administrator repeats this operation for the number of seats that the administrator wants the seat users to use.

In the seat map field 233, the layout of seats (groups of seats 235a to 235c) and pin icons 234 are displayed. The seat layout does not indicate the coordinates of the seats. The seat layout is just an image for the administrator to grasp the position of the seats. On the other hand, the coordinates of the pin icon 234 on the seat map are specified and stored in the seat position information.

The administrator does not have to place the pin icons 234 on all the seats on the layout, and can place the pin icons 234 with appropriate gaps in order to avoid crowding.

Also, the administrator can place the pin icon 234 regardless of the arrangement of the seats on the layout.

The registration reception unit 53 automatically assigns identification information to the pin icon 234 placed by the administrator. This identification information is the seat ID. The registration reception unit 53 stores the seat ID, the coordinates of the pin icon 234, and the seat map in the seat position information.

Note that the registration of the seat position using the pin icon 234 is an example. The pin icon 234 may be displayed by the administrator pressing the pin icon button 232 with a mouse or the like and then pressing the seat to be used with the mouse or the like. A menu displayed by right clicking the mouse may be used instead of the pin icon button 232.

By arranging the pin icon 234, the administrator can register the attribute for the seat. The administrator presses the area designation button 231. The area can be designated by the above operation. The pin icon 234 is the seat in the seat position registration screen 230.

Figure 12:
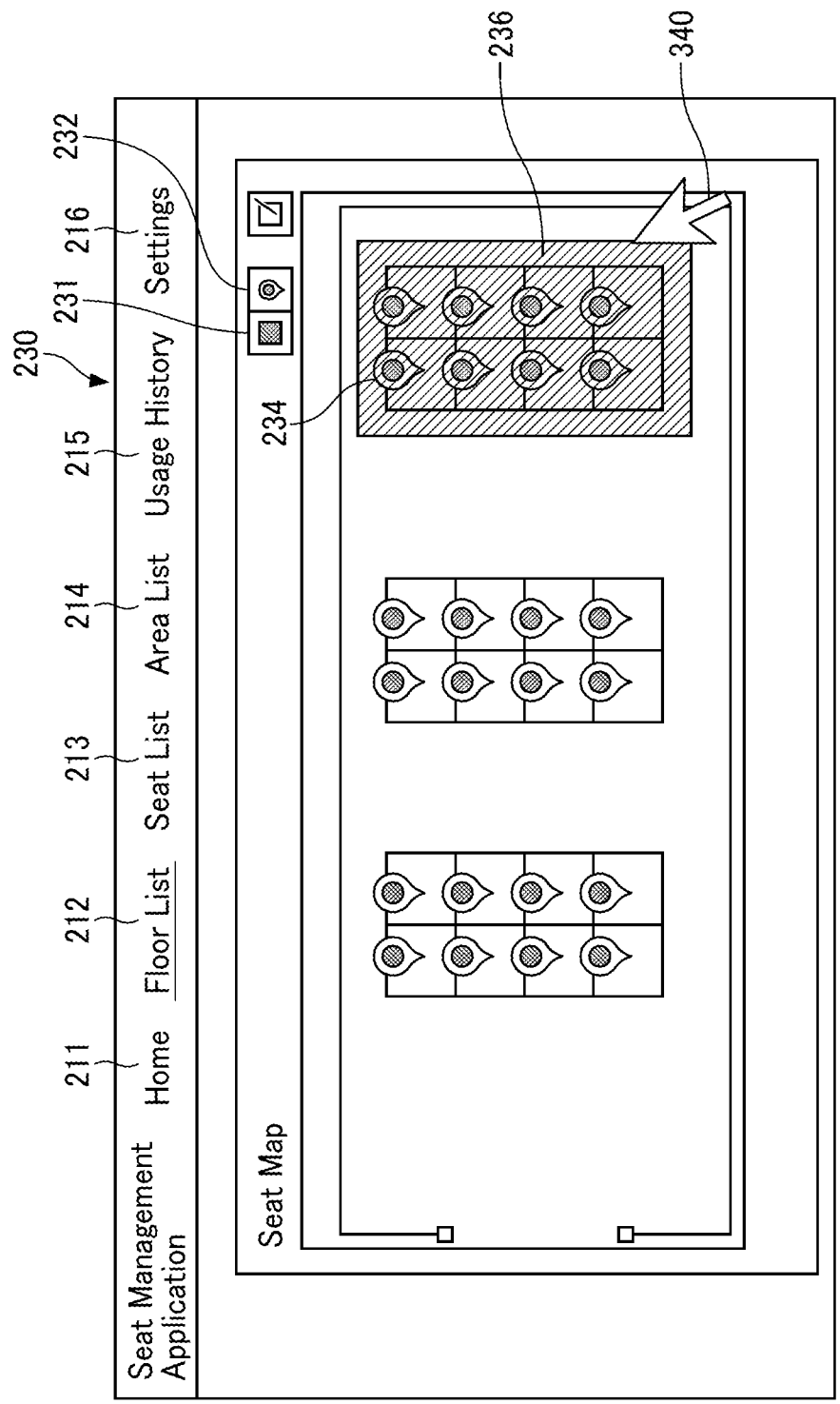
FIG. 12 is a diagram illustrating an example of a seat position registration screen when an area is designated to a pin icon.

FIG. 12 is a seat position registration screen 230 similar to FIG. 11, illustrating the seat position registration screen 230 when an area is designated for the pin icon 234. With reference to FIG. 12, the registration of attribute for the seat is described.

After pressing the area designation button 231, the administrator can designate an area on the seat map by dragging the pointing device 512 such as the mouse. In FIG. 12, an area 236 surrounding the right group 235c is designated. The attribute is registered for the pin icon 234 in this area. The administrator can select multiple pin icons 234 at a time, or can select a single pin icon 234. Since the number of seats is usually large, the work load can be reduced by collectively registering the attribute in this way.

Note that the dragging of the pointing device 512 is an example, and the administrator may designate two diagonal points of the area. Also, provided that the display 506 is a touch panel, the area 236 may be designated by swiping or may be designated by using a pen. Further, the area 236 may not be rectangular, and the administrator may draw a free curve with the pointing device 512 to designate a closed area.

The registration reception unit 53 compares the coordinates of designated area 236 with the coordinates of each pin icon 234 to determine the seat to register the attribute. The area 236 is displayed in the display color corresponding to the attribute registered in the attribute information of FIG. 5.

In the case the administrator is to set another attribute to the seat overlapping at least a part of the area 236, the area including the seat is designated separately by dragging the pointing device 512. Accordingly, the administrator is able to register multiple attributes for one seat.

Figure 13:
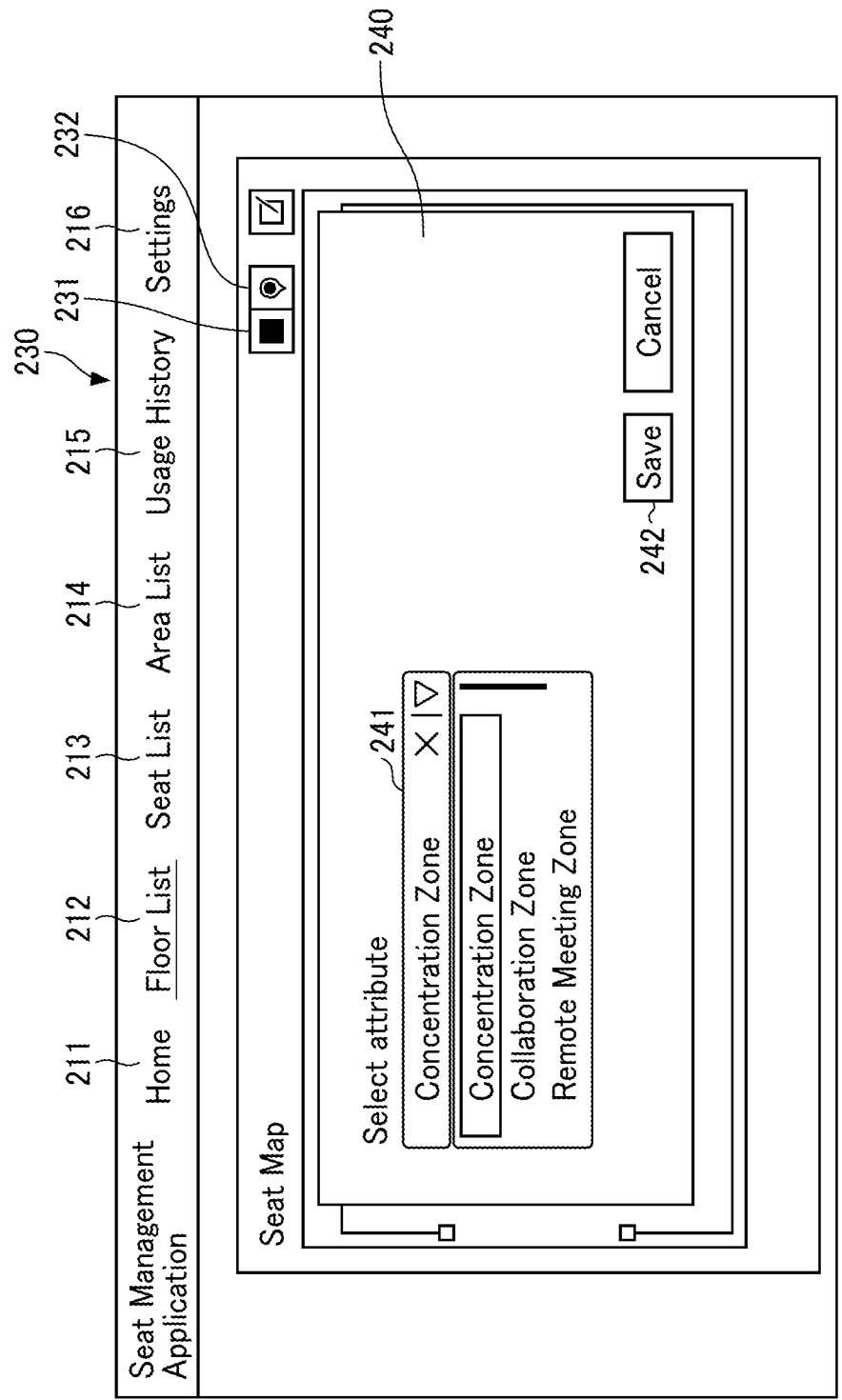
FIG. 13 is a diagram illustrating an example of an attribute setting dialog screen popped up on the seat position registration screen.

FIG. 13 illustrates an attribute setting dialog screen 240 popped up on the seat position registration screen 230. In response to the administrator designating an area as illustrated in FIG. 12, the administrator terminal 30 displays the attribute setting dialog screen 240. The attribute setting dialog screen 240 includes a pull-down menu 241 that displays the attributes in a selectable manner. In response to pressing of the pull-down menu 241 by the administrator, the attribute names registered in the attribute information are displayed. The administrator designates the attribute for the area set in FIG. 12.

Figure 14:
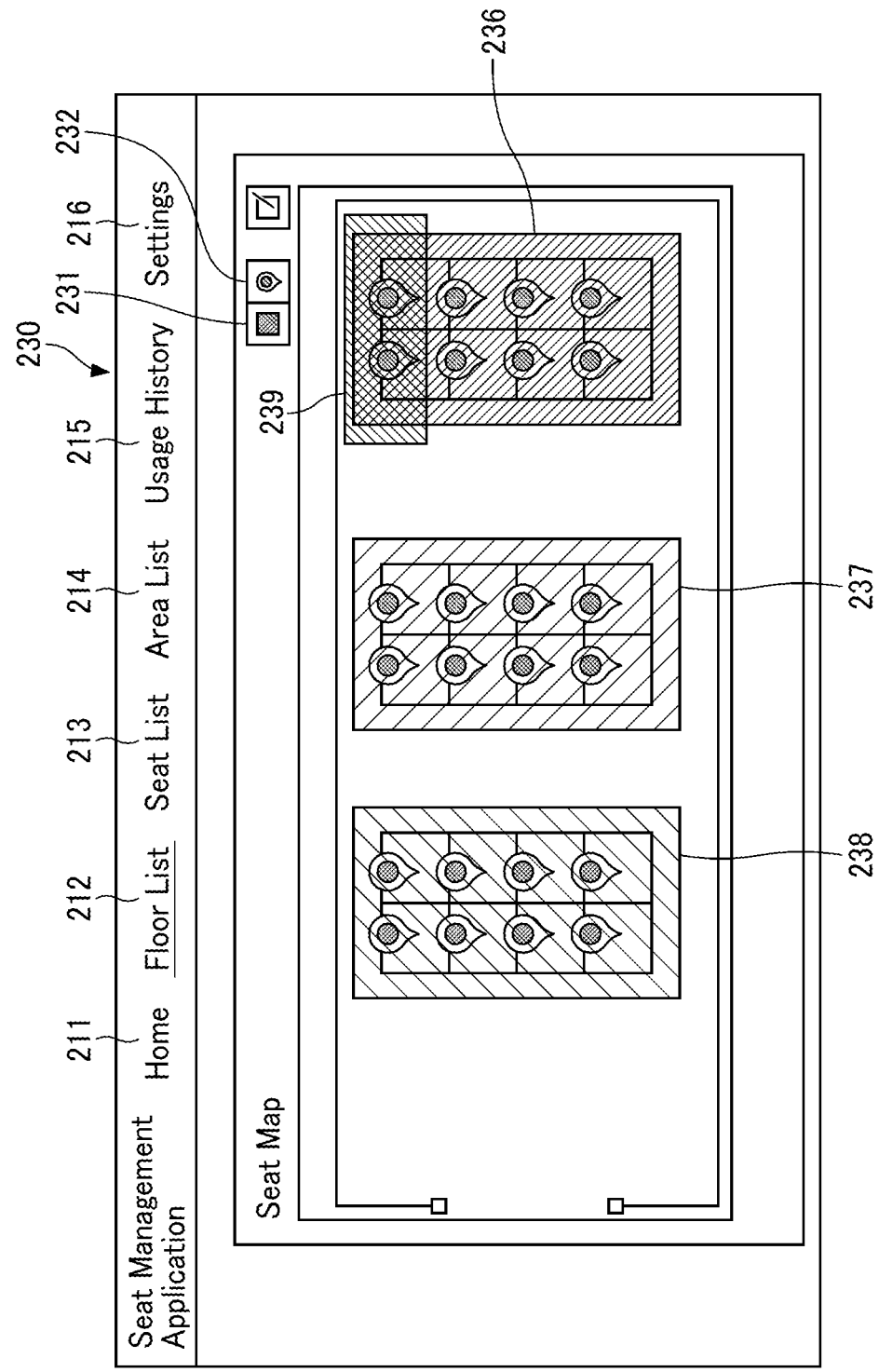
FIG. 14 is a diagram illustrating an example of a seat map in which attributes are set for a plurality of areas.

FIG. 14 illustrates a seat map in which the attributes are set for multiple areas. As illustrated in FIG. 14, when the administrator selects the attribute, the area 236 of seat position registration screen 230 is displayed in the display color corresponding to the attribute. In response to setting the attribute on each of the plurality of areas 236 to 239, each area 236 to 239 is displayed in the display color corresponding to the attribute.

Different attributes can be set in a plurality of overlapping areas such as in the area 236 and the area 239. In this case, two attributes set in areas 236 and 239 are registered for the same seat.

The registration reception unit 53 registers the seat ID included in area 236 with the attribute, floor name, floor number, and location in the seat information in association with each other.

The administrator may want to overwrite the attributes rather than setting different attributes for the same seat. The administrator may want to remove the attribute from one or more seats in the area 236. For these reasons, the operation reception unit 23 detects that another area overlaps the seat in the area 236, and the display control unit 22 may display a pull-down menu from which duplicate settings, overwrite settings, and attribute deletion can be selected. The administrator can easily select whether to duplicate the attribute setting, overwrite the attribute setting, or delete the attribute for the seat for which the attribute has already been set.

Figure 15:
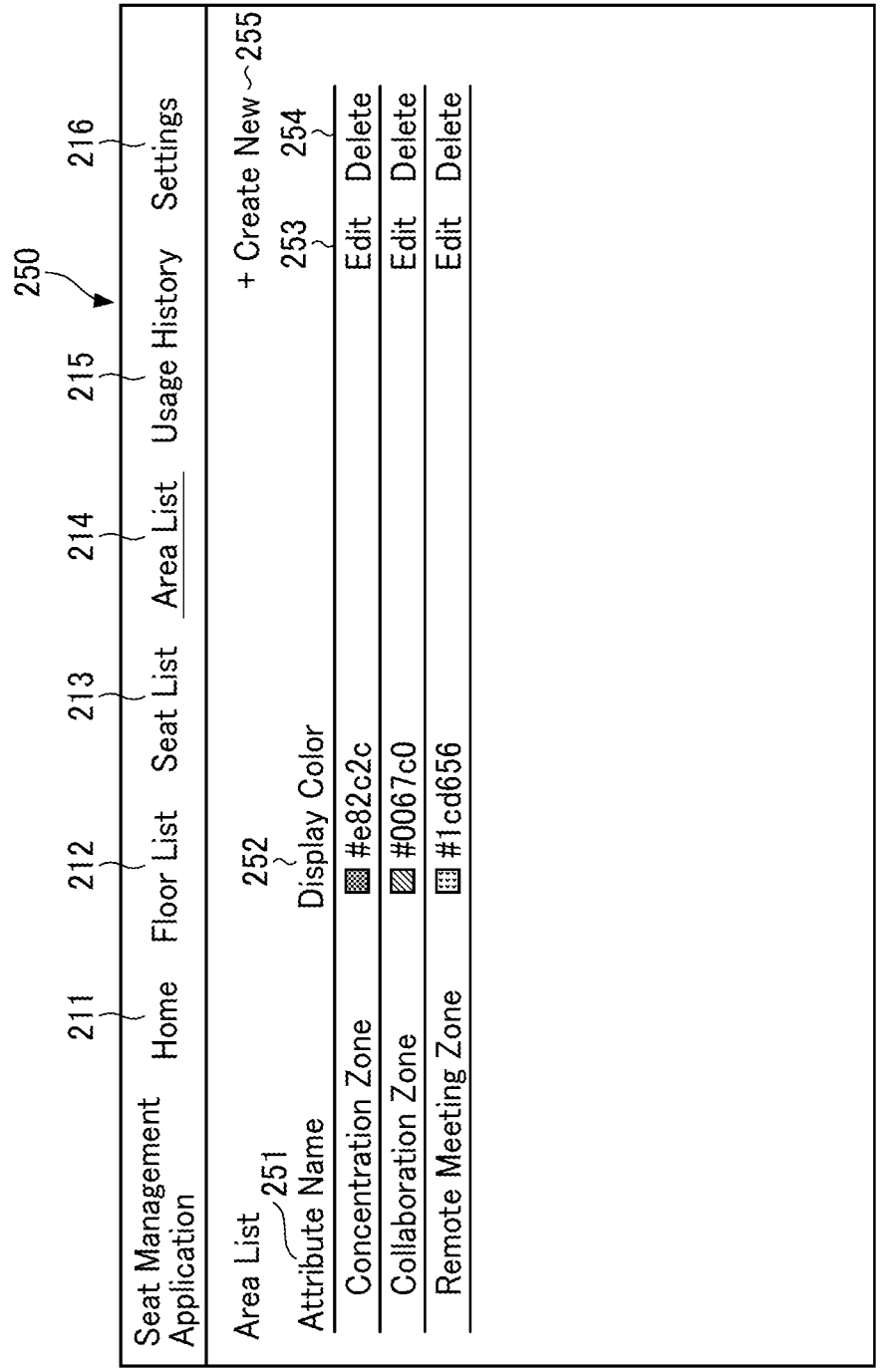
FIG. 15 is a diagram illustrating an example of an attribute editing screen for an administrator to edit the attribute information.

FIG. 15 is an attribute editing screen 250 for the administrator to edit the attribute information. In response to the administrator pressing the area list tab 214, the attribute editing screen 250 of FIG. 15 is displayed.

An attribute name 251 is the name of the attribute. The administrator may set any name as the attribute name.

A display color 252 is a color used to display the area for which the attribute is set. The administrator may set any color as the display color. The display colors are indicated in hexadecimal numbers in FIG. 15, but the display color may be selected from a color palette or the like.

An edit button 253 is a button to accept editing of the attribute name and the display color.

A delete button 254 is a button to accept deletion of the attribute name and the display color for one line on the attribute editing screen 250.

A create new button 255 is a button for the administrator to newly register the attribute.

Figure 16:
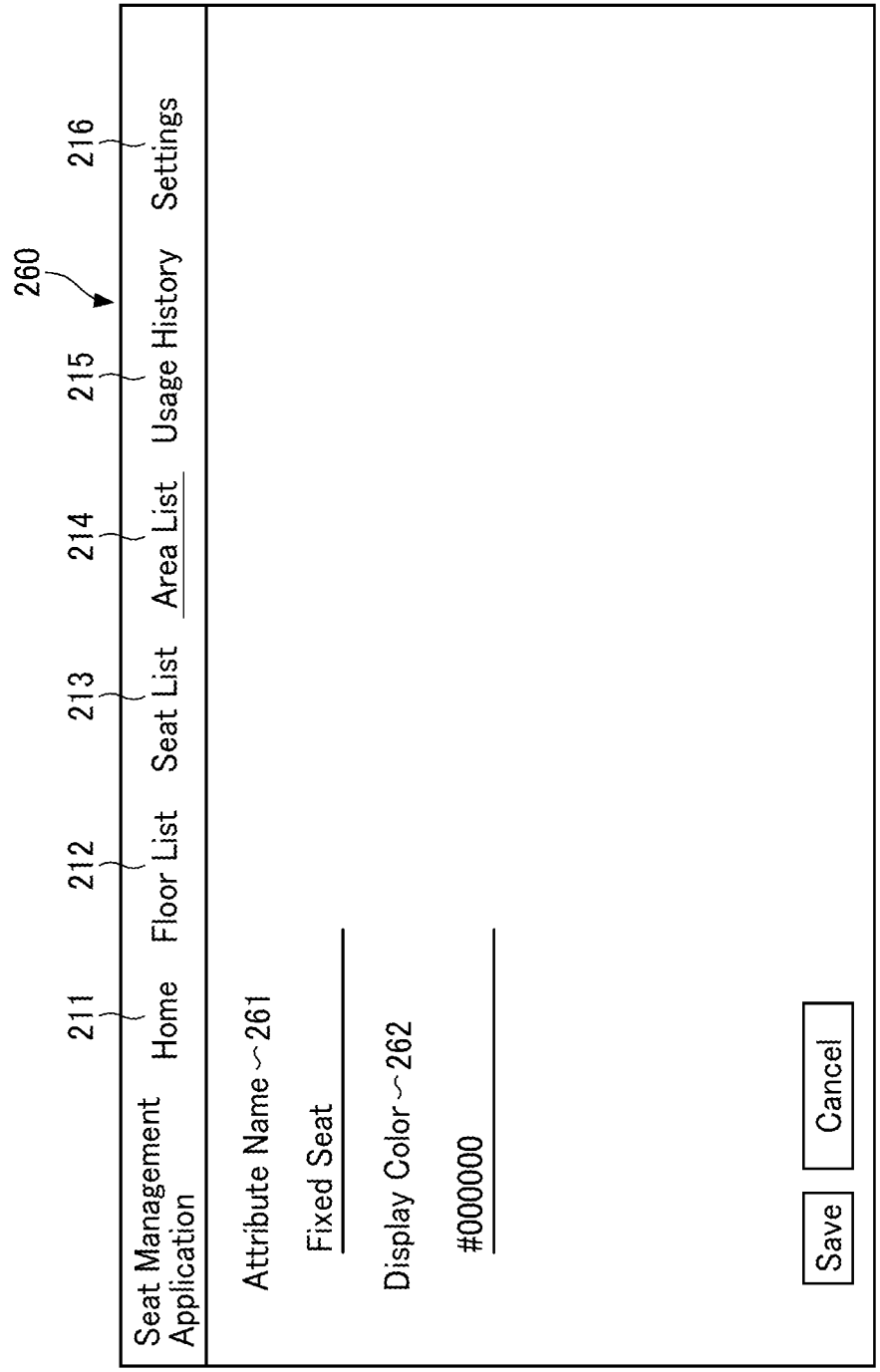
FIG. 16 is a diagram illustrating an example of an attribute name editing screen displayed in response to a pressing of an edit button or a create new button on the attribute editing screen.

FIG. 16 illustrates an attribute name editing screen 260 displayed in response to pressing of the edit button 253 or the create new button 255 on the attribute editing screen 250. The attribute name editing screen 260 includes an attribute name field 261 and a display color field 262. The administrator edits the attribute name in the attribute name field 261 and edits the display color in the display color field 262.

Figure 17:
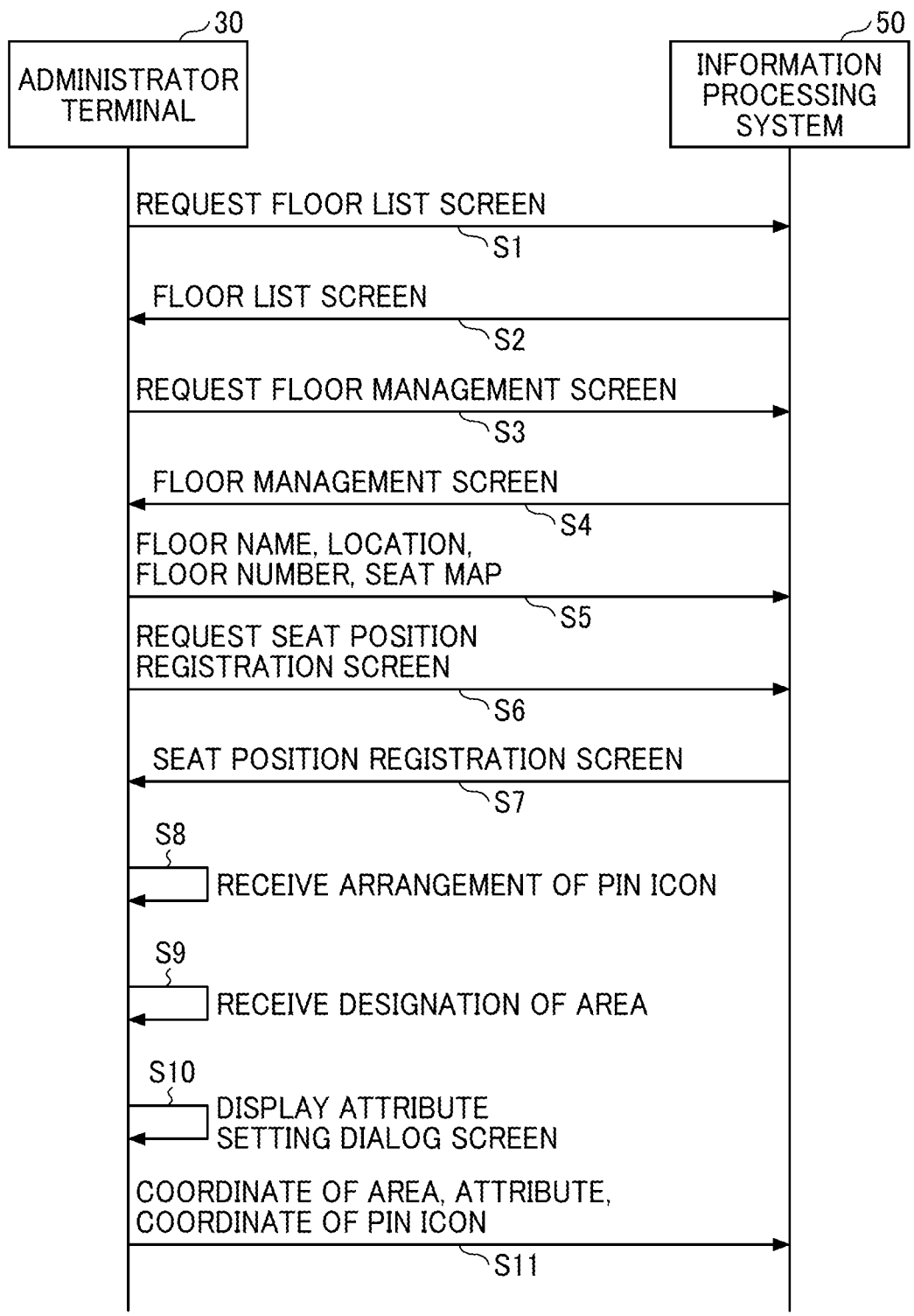
FIG. 17 is a sequence diagram illustrating an example of a process in which the administrator terminal communicates with the information processing system and the information processing system associates the attribute with the seat.

With reference to FIG. 17, a process of registering the attribute for seat by the administrator is described. FIG. 17 is a sequence diagram illustrating a process executed by the information processing system 50 to associate the attribute with the seat through communication between the administrator terminal 30 and the information processing system 50.

S1: The administrator operates the administrator terminal 30 to connect the administrator terminal 30 to the information processing system 50. The administrator inputs a request to display the floor list screen 200 to the administrator terminal 30. The operation reception unit 33 of the administrator terminal 30 receives the operation. The communication unit 31 of the administrator terminal 30 transmits the request for the floor list screen to the information processing system 50.

S2: The communication unit 51 of the information processing system 50 receives the request for the floor list screen and the screen generation unit 52 generates the floor list screen 200. Here, the floor name and the like may or may not be registered. The communication unit 51 of the information processing system 50 transmits the screen information of the floor list screen 200 to the administrator terminal 30. The communication unit 31 of the administrator terminal 30 receives the screen information of the floor list screen 200, and the display control unit 32 displays the floor list screen 200. The administrator inputs information to be input to the floor list screen 200.

S3: The administrator inputs a request to display the floor management screen 220 to the administrator terminal 30. The operation reception unit 33 of the administrator terminal receives the input. The communication unit 31 of the administrator terminal 30 transmits the request for the floor management screen to the information processing system 50.

S4: The communication unit 51 of the information processing system 50 receives the request for the floor management screen and the screen generation unit 52 generates the floor management screen 220. The communication unit 51 of the information processing system 50 transmits screen information of the floor management screen 220 to the administrator terminal 30. The communication unit 31 of the administrator terminal 30 receives the screen information of the floor management screen 220, and the display control unit 32 displays the floor management screen 220.

S5: The administrator edits the floor name, location, floor number, seat map, and the like on the floor management screen 220. The operation reception unit 33 of the administrator terminal 30 receives the editing. The communication unit 31 of the administrator terminal 30 transmits the floor name, location, floor number, and seat map to the information processing system 50.

S6: The administrator inputs a request to display the seat position registration screen 230 to the administrator terminal 30. The operation reception unit 33 of the administrator terminal 30 receives the input. The communication unit 31 of the administrator terminal 30 transmits the request for the seat position registration screen to the information processing system 50.

S7: The communication unit 51 of the information processing system 50 receives the request for the seat position registration screen and the screen generation unit 52 generates the seat position registration screen 230 using the seat map. The screen generation unit 52 generates screen information that enables moving of the pin icon 234 and setting of the area 236 on the seat map. The communication unit 51 of the information processing system 50 transmits the screen information of the seat position registration screen 230 to the administrator terminal 30. The communication unit 31 of the administrator terminal 30 receives the screen information of the seat position registration screen 230 and the display control unit 32 displays the seat position registration screen 230.

S8: The administrator places the pin icon 234 representing an available seat on the seat position registration screen 230. The operation reception unit 33 of the administrator terminal 30 receives placement of the pin icon 234.

S9: The administrator designates an area surrounding the available seat on the seat position registration screen 230 by dragging the pointing device or the like. The operation reception unit 33 of the administrator terminal 30 receives designation of the area.

S10: The display control unit 32 displays the area 236 in the designated display color in response to receiving of the designation of the area by the operation reception unit 33. The display control unit 32 further displays the attribute setting dialog screen 240. The administrator selects an attribute from the pull-down menu 241 on the attribute setting dialog screen 240. The operation reception unit 33 receives a selection of attribute.

S11: In response to the administrator pressing the save button 242 on the attribute setting dialog screen 240, the operation reception unit 33 of the administrator terminal 30 receives the operation, and the communication unit 31 transmits the coordinates of the area 236, the attribute to be set to the seat, and the coordinates of each pin icon 234 to the information processing system 50. The communication unit 51 of the information processing system 50 receives the coordinates of the area 236, the selected attribute, and the coordinates of each pin icon 234. The registration reception unit 53 assigns a seat ID to each pin icon 234, associates the seat ID with the coordinates of the pin icon 234 and the seat map, and stores the information in the seat position information. Further, the registration reception unit 53 stores the seat ID, attribute, floor name, floor number, and location in association with each other in the seat information.

As a result of the above processing, the seat is placed on the seat map and the attribute of the seat is assigned to the seat according to the operation by the administrator. The process of FIG. 17 is an example, and communication between the administrator terminal 30 and the information processing system 50 may be performed at timings other than those illustrated.

With reference to FIGS. 18 to 21, screens displayed by the user terminal 20 are described.

The screens displayed by the user terminal 20 are, for example, screens related to searching and reserving the seat. In the present embodiment, screens are described assuming that the user terminal 20 is a PC. In the case the user terminal 20 is a smartphone, the displayed content is the same although screen configuration is different.

FIG. 18 illustrates a seat availability screen 270 displayed by the user terminal 20. The seat availability screen 270 is a screen for the seat user to check a reservation status and the seats that the seat user used in the past. The seat availability screen 270 is displayed by pressing a home tab 211. The displayed tabs are slightly different between the administrator terminal 30 and the user terminal 20 due to difference in authority. The difference is a seat search tab 274 which is a tab for searching the seats.

A reservation status field 271 displays information related to the reservation of the seat. Since FIG. 18 illustrates the screen before reservation, nothing is displayed. The reservation status field 271 after reservation is described with reference to FIG. 21. The seat user is allowed to cancel the seat reservation of the seat already reserved by the seat user.

A recently used floor and usage rate field 272 is information related to the seat used by the seat user in the most recent period (one month to one year, and the like). In the recently used floor and usage rate field 272, usage rate is displayed in association with the location name and the floor name.

A today's member attendance status field 273 displays an attendance status of members of the same department or team. The reservation start time and reservation end time are displayed along with the location name, floor name, and seat ID of the seat reserved by the member. Further, when the seat user registers the start of use of the seat by the method described below, a message or mark such as "in use" is displayed.

FIG. 19 illustrates a seat search screen 280 displayed by the user terminal 20. The seat search screen 280 is displayed by pressing a seat search tab 274. The seat user searches for a seat that satisfies a condition from the seat search screen 280 and reserve the seat according to the search result.

The attribute of the seat may be designated in the seat search condition. Further, the seat user may designate multiple attributes.

A date field 281 is the date for which the seat is desired to be reserved. The seat user selects the date from a pull-down menu or a calendar. The date field 281 is initially set to a current day or a next day.

A start time field 282 is a field to set a start time of the reservation period on the date of use. The seat user selects the time from a pull-down menu or input any time of the seat user's choice. For example, the current time is initially set in the start time field 282.

An end time field 283 is a field to set the time to end the reservation period on the date of use. The seat user selects the time from the pull-down menu or input any time of the seat user's choice. For example, the end of work time is initially set in the end time field 283.

A floor field 284 is a field to set the location and floor of the seat to be reserved. The seat user selects the location and floor from a pull-down menu. In the floor field 284, for example, the floor name of the last search is initially set.

An attribute field 285 is a field to set the attribute of the seat to be reserved. The seat user selects the attribute from a pull-down menu. In the attribute field 285, for example, the attribute name of the last search is initially set.

The seat user sets these search conditions and presses a search button 286. The seat user may not set all the search conditions. In this case, the information processing system 50 may automatically determine vacant seats from floors with few reservations.

FIG. 20 illustrates a search result screen 290 displaying the search result by pressing a search button 286. A search result 287 indicating the seats satisfying the set search condition is displayed on the right side of the search result screen 290. The seat user can reserve any seat from the search results 287.

A seat number 288 indicates the seat ID.

A floor name 289 is the name of the floor where the seat is located.

An available time 292 is a time period during which a seat can be reserved.

A reservation button 291 is a button for making a reservation.

In response to the seat user pressing the reservation button 291, the seat for which the reservation button 291 is displayed is reserved from the start time to the end time designated by the search condition.

FIG. 21 illustrates the seat availability screen 270 displayed by the user terminal 20 after making the reservation.

The reservation status field 271 displays reservation information related to the reserved seat. In the example illustrated in FIG. 21, the reservation information for three reservations is displayed. The reservation information includes the seat ID 301, location name 302, floor name 303, reservation start date and time 304, reservation end date and time 305, seat status 306, and the like.

Buttons corresponding to the status are displayed for each reservation. A change time button 293 and an end use button 294 are displayed for the reservation information of the seat in use (seat status 306 is "in use"). The change time button 293 is a button for changing the reserved end date and time of the reservation. An end use button 294 is a button for releasing the seat (making the seat vacant) before the reservation end date and time.

For the seat reservation information before the start of use (seat status 306 is "reserved"), a start use button 295, the change time button 293, and a cancel reservation button 296 are displayed. The start use button 295 is a button for registering the start of use of the seat. The start use button 295 is not displayed unless certain conditions are met. The certain conditions are, for example, a certain period of time before the reservation start date and time, or the latest reservation of the target seat is the reservation on the day of the reservation, and the like. The certain period of time is assumed to be, for example, about 10 to 30 minutes. This condition of allowing the start of use at a certain time before the reserved time causes the use of the seat within the reserved time. In the present embodiment, the start use button 295 is displayed before the certain time.

As a method for starting to use the seat, the seat user may read the coded information attached to the seat with the user terminal 20. The change time button 293 is a button for changing the reservation start date and time and reservation end date and time. The cancel reservation button 296 is a button for canceling the reservation. Cancellation of the reservation may be performed by deleting the reservation information, or by registering invalidation in the reservation information.

The change time button 293 and the cancel reservation button 296 are displayed for reservation information of a seat that has not yet been used (seat status 306 is "reserved") but is not after the certain time period before the reservation start date and time. The start use button 295 is not displayed because the certain time period before the reservation start date and time has not arrived. By doing so, the equipment utilization system 1 can restrict usage during unreserved time slots.

With reference to FIG. 22, a process for the seat user to reserve a seat is described. FIG. 22 is a sequence diagram illustrating the process of the information processing system 50 receiving a reservation through the communication between the user terminal 20 and the information processing system 50.

S21: The seat user operates the user terminal 20 to connect the user terminal 20 to the information processing system 50. Then the seat user inputs a request to display the seat search screen 280 to the user terminal 20. The operation reception unit 23 of the user terminal 20 receives the request. Accordingly, the communication unit 21 of the user terminal 20 transmits a request for a seat search screen to the information processing system 50.

S22: The communication unit 51 of the information processing system 50 receives the request for the seat search screen, and the screen generation unit 52 generates the seat search screen 280. The communication unit 51 of the information processing system 50 transmits screen information of the seat search screen 280 to the user terminal 20. The communication unit 21 of the user terminal 20 receives the screen information of the seat search screen 280, and the display control unit 22 displays the seat search screen 280.

S23: The seat user sets search conditions on the seat search screen 280. The operation reception unit 23 of the user terminal 20 receives the setting of the search condition.

S24: The communication unit 21 of the user terminal 20 transmits a search request designating the search condition to the information processing system 50.

S25: The communication unit 51 of the information processing system 50 receives the search request and the search unit 56 searches for the seat that matches the search condition. The search unit 56 searches for a seat that is available on the designated floor from the start time to the end time of the date of use and has the attribute designated in the attribute field 285.

S26: The communication unit 51 of the information processing system 50 transmits a search result to the user terminal 20.

The communication unit 21 of the user terminal 20 receives the search result, and the display control unit 22 displays the search result on the search result screen 290.

The seat user selects a seat from one or more search results and presses the reservation button 291. The operation reception unit 23 of the user terminal 20 receives the pressing of the reservation button.

S27: The communication unit 21 of the user terminal 20 transmits a reservation request to the information processing system 50 designating the seat ID, reservation start date and time, reservation end date and time, and user ID. Note that the seat user is assumed to have logged in to the information processing system 50, and the user ID is identified by the login. Instead of the user ID, a token that substitute for the user ID may be used.

S28: The communication unit 51 of the information processing system 50 receives the reservation request, and the reservation management unit 54 stores the reservation information in the reservation information storage unit 5003.

S29: The communication unit 51 of the information processing system 50 transmits the reservation information to the user terminal 20. The communication unit 21 of the user terminal 20 receives the reservation information. In response to the seat user causing the seat availability screen 270 to be displayed, the display control unit 22 displays the reservation information.

As described above, the seat having the attributes desired by the seat user is reserved. The seat user may not make the reservation in advance, and may use the seat without reservation as long as the seat that the set user wants to use is available.

Figure 23:
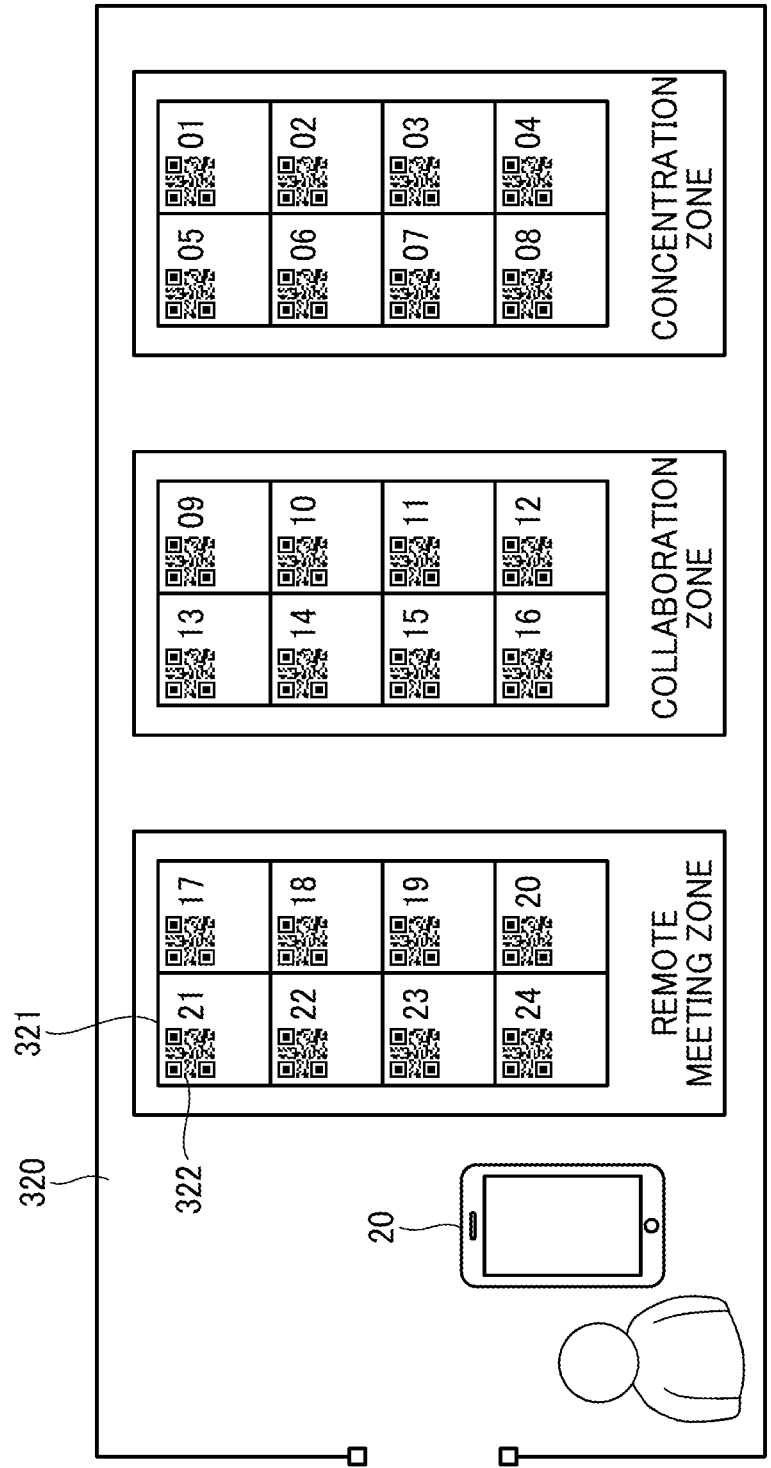
FIG. 23 is a schematic diagram illustrating an example of an office with the seats.

With reference to FIGS. 23 and 24, examples of screens displayed when the seat user uses the seat is described. The seat user may or may not have reserved a seat, but the operations up to transmission of a request to start using a seat are the same.

FIG. 23 schematically illustrates the office 320 in which seats are placed. Seats 321 are arranged in the office 320 in the same layout as the seat map. In FIG. 23, eight seats 321 are placed in each of three groups of seats as an example. Coded information 322 is affixed to the seats available to the seat user. The coded information 322 is, for example, a QUICK RESPONSE (QR) code (registered trademark), a barcode, or the like. In the coded information 322, the seat ID and the uniform resource locator (URL) where the information processing system 50 receives the use start request are encoded. The administrator prints the coded information 322 obtained by coding the seat ID and the URL generated by arranging the pin icons 234 with a printer. Preferably, a plaintext seat ID is also printed so that the seat user is able to identify the reserved seat. In addition, the attribute may be displayed on each seat so that the attribute registered to the seat can be understood, or may be displayed on a panel or the like.

On the reservation day, the seat user reads the coded information 322 with the camera on the user terminal 20. A typical user terminal 20 includes a function of decoding the coded information and detects the seat ID and URL. In response to the user terminal 20 detecting the URL, the communication unit 21 connects to the URL, designates the seat ID, and transmits a use start request to the information processing system 50.

In response to the information processing system 50 receiving the use start request, the use start is registered provided that the reservation has already been made. In the case the reservation has not been completed, the information processing system 50 provides the user terminal 20 with a use start screen 330 for receiving time to use the seat.

FIG. 24 illustrates a use start screen 330 displayed by the user terminal 20. As illustrated in FIG. 24, the use start screen 330 has the same configuration as the seat search screen 280. The date field 331, the start time field 332, the end time field 333, the floor field 334, and the attribute field 335 correspond to the date field 281, the start time field 282, the end time field 283, the floor field 284, and the attribute field 285 of the seat search screen 280.

The seat user does not have to input the field filled in association with the seat ID. The current date is automatically set in the date field 331. In the start time field 332, the current time or the start time of available reservation is automatically set. In the end time field 333, the seat user sets a scheduled end time. The floor name and attribute fixed in association with the seat ID are automatically set in the floor field 334 and the attribute field 335. The seat user is to set the end time in the end time field 333. The date field 331, the start time field 332, the floor field 334, and the attribute field 335 may be blocked for entry so that the seat user does not change the information by mistake. Alternatively, the date field 331, the start time field 332, the floor field 334, and the attribute field 335 may be displayed with low brightness.

In response to the seat user pressing an OK button 336, a reservation request is sent to the information processing system 50 together with the information set on the use start screen 330. In response to the seat user pressing a cancel button 337, the information set on the use start screen 330 is discarded.

Figure 25:
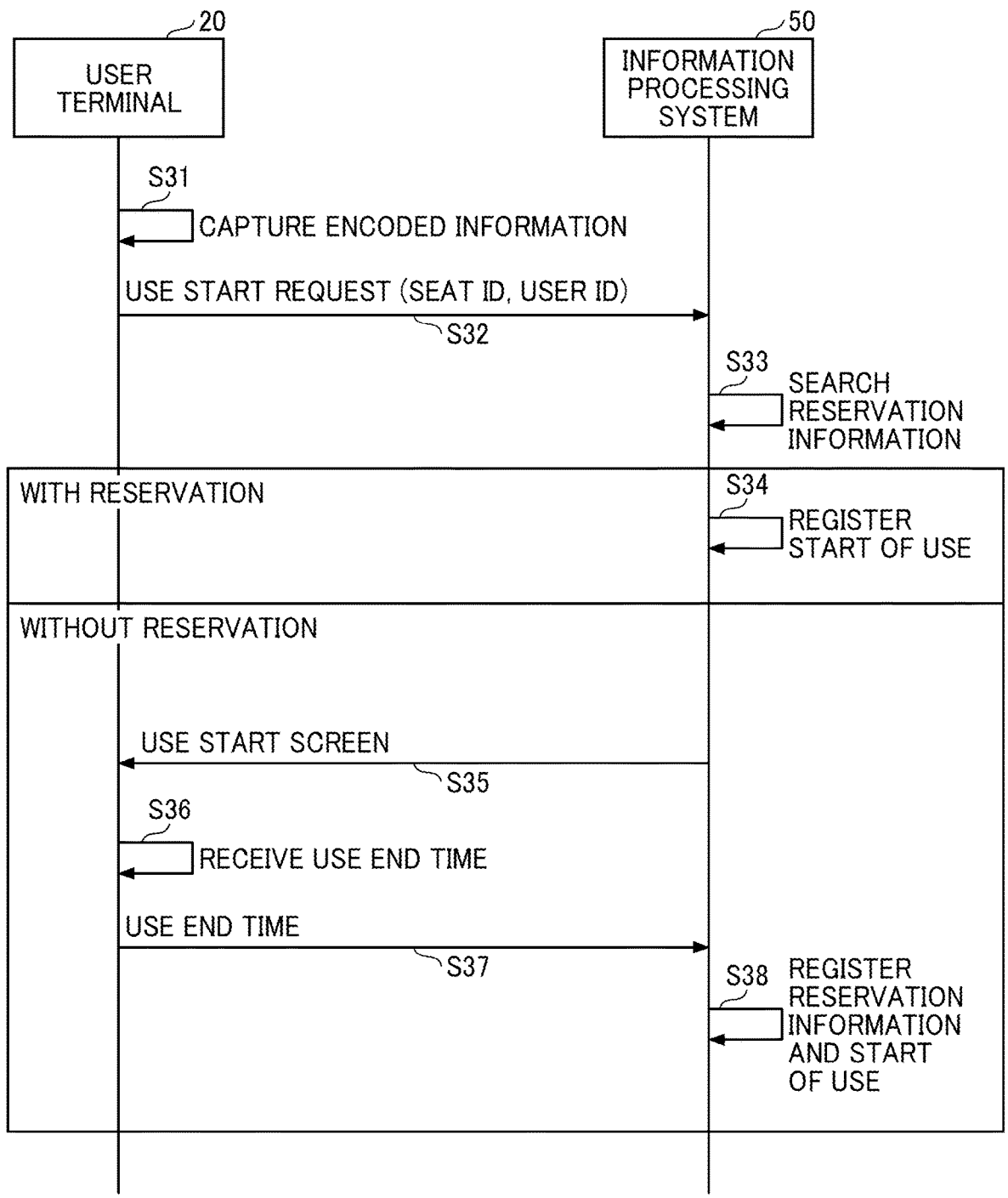
FIG. 25 is a sequence diagram illustrating an example of a process in which the user terminal communicates with the information processing system and the information processing system receives a start of use (coded information)

With reference to FIG. 25, a process for the seat user to start using the seat is described.

FIG. 25 is a sequence diagram illustrating a process in which the information processing system 50 receives the start of use by the user terminal 20 and the information processing system 50 communicating with each other.

S31: The seat user operates the user terminal 20 to capture the coded information attached to the seat. The capturing unit 24 converts the coded information into image data, and the decoding unit 25 decodes the seat ID and URL. In response to the seat user inputting an operation to connect to the URL on the user terminal 20, the operation reception unit 23 of the user terminal 20 receives the operation, and the communication unit 21 connects to the URL.

S32: The communication unit 21 of the user terminal 20 designates the seat ID and the user ID and transmits a use start request to the information processing system 50. The seat user is assumed to have logged in to the information processing system 50.

S33: The communication unit 51 of the information processing system 50 receives the use start request, and the usage management unit 55 searches for the reservation information using the seat ID and the user ID. The usage management unit 55 searches the reservation information for the day by the seat ID, and determines whether a reservation start date and time within a certain time (for example, within about 10 to 30 minutes) from the current time is registered. When a reservation start date and time within a certain period of time from the current time is registered, the usage management unit 55 determines whether the user ID transmitted by the user terminal 20 matches the user ID in the reservation information.

S34: Provided that a reservation start date and time within a certain period of time from the current time is registered, and the user ID transmitted by the user terminal 20 matches the user ID in the reservation information, the usage management unit 55 determines that the reservation has been completed, and registers the start of use (register the current time in the usage history). For example, when a member different from the seat user displays the seat availability screen 270, "in use" is displayed for the seat in the today's member attendance status field 273.

S35: In the case there is no reservation start date and time within a certain period of time from the current time, or in the case a reservation start date and time within a certain period of time from the current time is registered but the user ID sent by the user terminal 20 and the user ID in the reservation information do not match (reserved by a different user), the usage management unit 55 determines that the seat user who sent the use start request has not reserved the seat in either case.

The screen generation unit 52 generates the use start screen 330 illustrated in FIG. 24. For example, in the case a reservation start date and time within the certain period of time from the current time is not registered, the current time is displayed in the start date and time of the use start screen 330. The end date and time is set by the seat user, but the screen generation unit 52 should remind the seat user that the seat user may input up to the reserved use start date and time.

In the case the user ID transmitted by the user terminal 20 and the user ID in the reservation information do not match, the screen generation unit 52 generates a message indicating that the reservation is not acceptable. Alternatively, the screen generation unit 52 generates the use start screen 330 in which the time after the reservation end date and time can be input as the start date and time and the end date and time on the use start screen 330. For example, in the case a different seat user has made a reservation from 9:00 to 17:00, the seat user can enter the time after 17:00 in the start date and time and the end date and time on the use start screen 330.

Accordingly, in the case the coded information of a seat different from the seat reserved by the seat user is captured, the seat user can use the seat that was seated by mistake provided that the wrong seat has not been reserved. In this case, since the start of use of the seat reserved by the seat user is not registered within the certain period of time from the reservation start date and time, the seat is automatically canceled.

The communication unit 51 of the information processing system 50 transmits the screen information of the use start screen 330 to the user terminal 20. The communication unit 21 of the user terminal 20 receives the screen information of the use start screen 330, and the display control unit 22 displays the use start screen 330.

S36: The seat user inputs the end time on the use start screen 330. The operation reception unit 23 of the user terminal 20 receives the input.

S37: In response to the seat user pressing the OK button 336, the communication unit 21 of the user terminal 20 transmits the end time to the information processing system 50.

S38: The communication unit 51 of the information processing system 50 receives the end time, and the reservation management unit 54 stores the reservation information (seat ID, reservation start date and time, reservation end date and time, user ID) in the reservation information storage unit 5003. Further, provided that the reservation start date and time is after the certain period of time, the usage management unit 55 stores the use start (the current time in the usage history) in the reservation information storage unit 5003.

As described above, the seat user can start using the seat regardless of whether the seat has been reserved or not.

Figure 26:
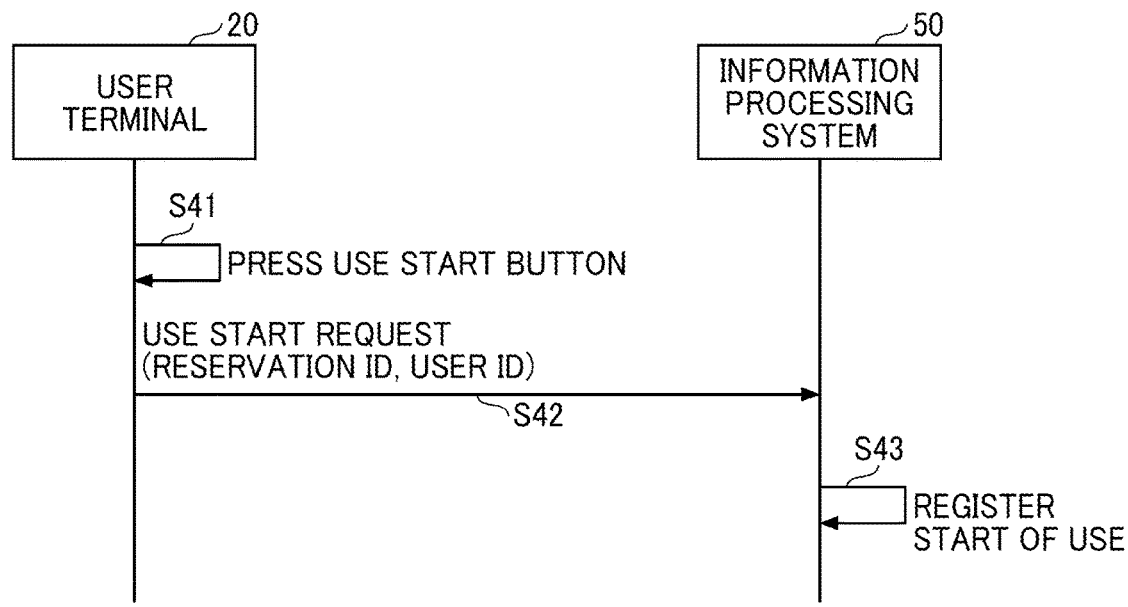
FIG. 26 is a sequence diagram illustrating an example of a process in which the user terminal communicates with the information processing system and the information processing system receives the start of use (start use button)

With reference to FIG. 26, a case where the seat user presses the start use button 295 on the seat availability screen 270 of FIG. 21 is described. FIG. 26 is a sequence diagram illustrating a process in which the information processing system 50 receives the start of use by the user terminal 20 and the information processing system 50 communicating with each other. The processing in this case is the same as in the case the seat is reserved.

S41: Assume that the user terminal 20 has already displayed the seat availability screen 270.

The seat user presses the start use button 295. The start use button 295 is displayed after the certain time before the reservation start date and time. The operation reception unit 23 of the user terminal 20 receives the pressing of the reservation button.

S42: The communication unit 21 of the user terminal 20 transmits to the information processing system 50, a use start request designating the reservation ID and the user ID.

S43: The communication unit 51 of the information processing system 50 receives the use start request. Since the start use button 295 is displayed after the certain time before the reservation start date and time, the usage management unit 55 does not determine whether a reservation start date and time within the certain time from the current time is registered. In addition, since the start use button 295 is displayed for the seat reserved by the seat user who has logged in, the usage management unit 55 does not determine whether the user ID transmitted by the user terminal 20 and the user ID in the reservation information match (although determination may be performed). Accordingly, the usage management unit 55 registers the start of use in the reservation information designated by the reservation ID (registers the current time in the usage history).

Further, in the case the seat user does not perform the operation to start the use (in the case the coded information is not captured or the end use button 294 is not pressed), the usage management unit 55 determines that the use start date and time have passed by a certain time or more and cancels the reservation.

Figure 27:
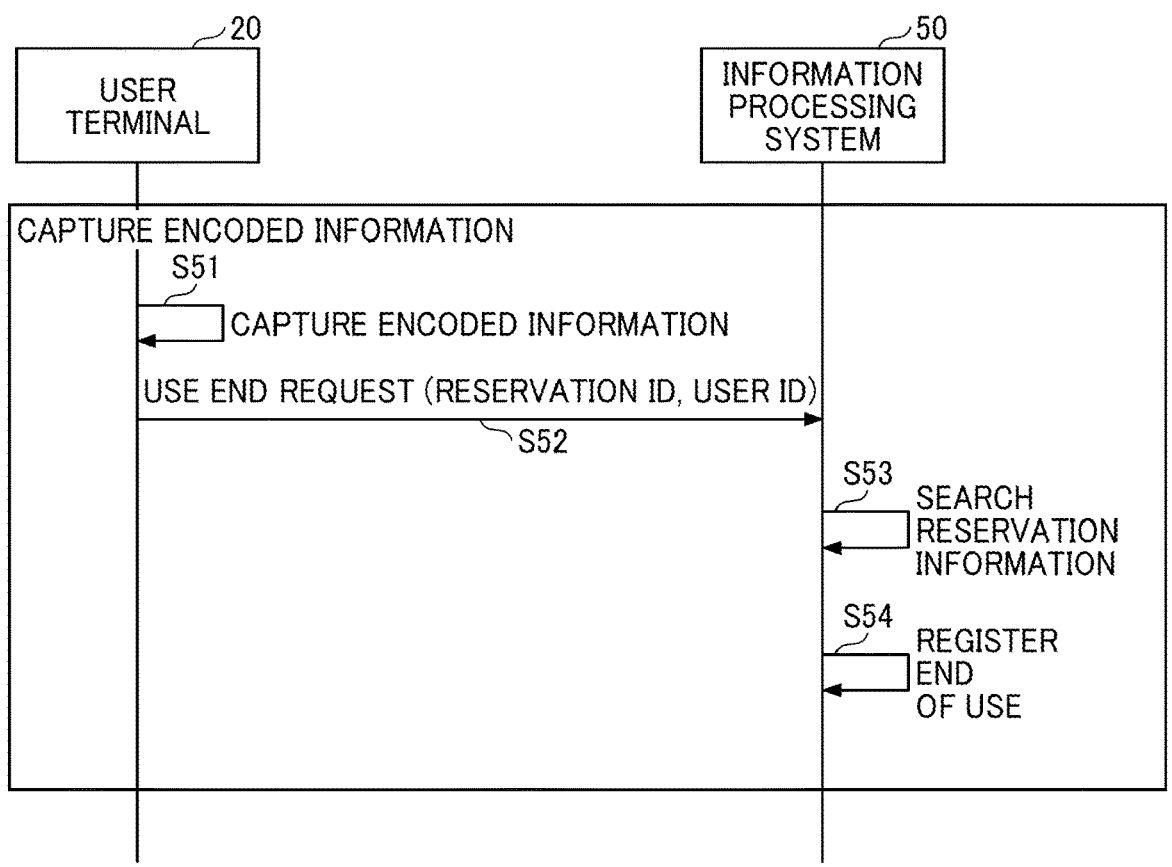
FIG. 27 is a sequence diagram illustrating an example of a process in which the user terminal communicates with the information processing system and the information processing system receives an end of use (coded information)

With reference to FIG. 27, a process for the seat user to end the use of the seat is described.

FIG. 27 is a sequence diagram illustrating the process in which the information processing system 50 receives the start of use by the user terminal 20 and the information processing system 50 communicating with each other. As a method of ending the use, there are a method in which the seat user captures an image of the coded information and a method in which the seat user presses the end use button 294. First, the method for capturing the coded information by the seat user is described.

S51: The seat user operates the user terminal 20 to capture the coded information attached to the seat. The capturing unit 24 converts the coded information into image data, and the decoding unit 25 decodes the seat ID and URL. In response to the seat user inputting an operation to connect to the URL, the operation reception unit 23 of the user terminal 20 receives the operation, and the communication unit 21 connects to the URL.

S52: The communication unit 21 of the user terminal 20 transmits the seat ID and the user ID to the information processing system 50. The seat user is assumed to have logged in to the information processing system 50.

S53: The communication unit 51 of the information processing system 50 receives the seat ID and the user ID, and the usage management unit 55 searches for reservation information using the seat ID and the user ID. The usage management unit 55 determines whether the use start (that is, use start time) is registered for the seat designated by the seat ID. In the case use start is registered, the usage management unit 55 determines whether the user ID transmitted by the user terminal 20 matches the user ID of the reservation information.

In the case neither the start of use nor the end of use is registered, the usage management unit 55 determines that the start of use is requested. In this case, the process of FIG. 25 is executed.

In the case the start of use is registered, but the user ID transmitted by the user terminal 20 and the user ID in the reservation information do not match, since the user of the seat other than the person who made the reservation is assumed to capture the image of the coded information, the usage management unit 55 determines that the operation is a mistake. Accordingly, the usage management unit 55 returns an error message or the like and does not accept the end of use.

In the case the start of use is registered and the user ID transmitted by the user terminal 20 matches the user ID of the reservation information, the usage management unit 55 determines that the request is for the end of use. Here, the usage management unit 55 is assumed to determine that the request is for the end of use.

S54: The usage management unit 55 of the information processing system 50 stores the end of use (end time of the usage history) in the reservation information storage unit 5003.

Figure 28:
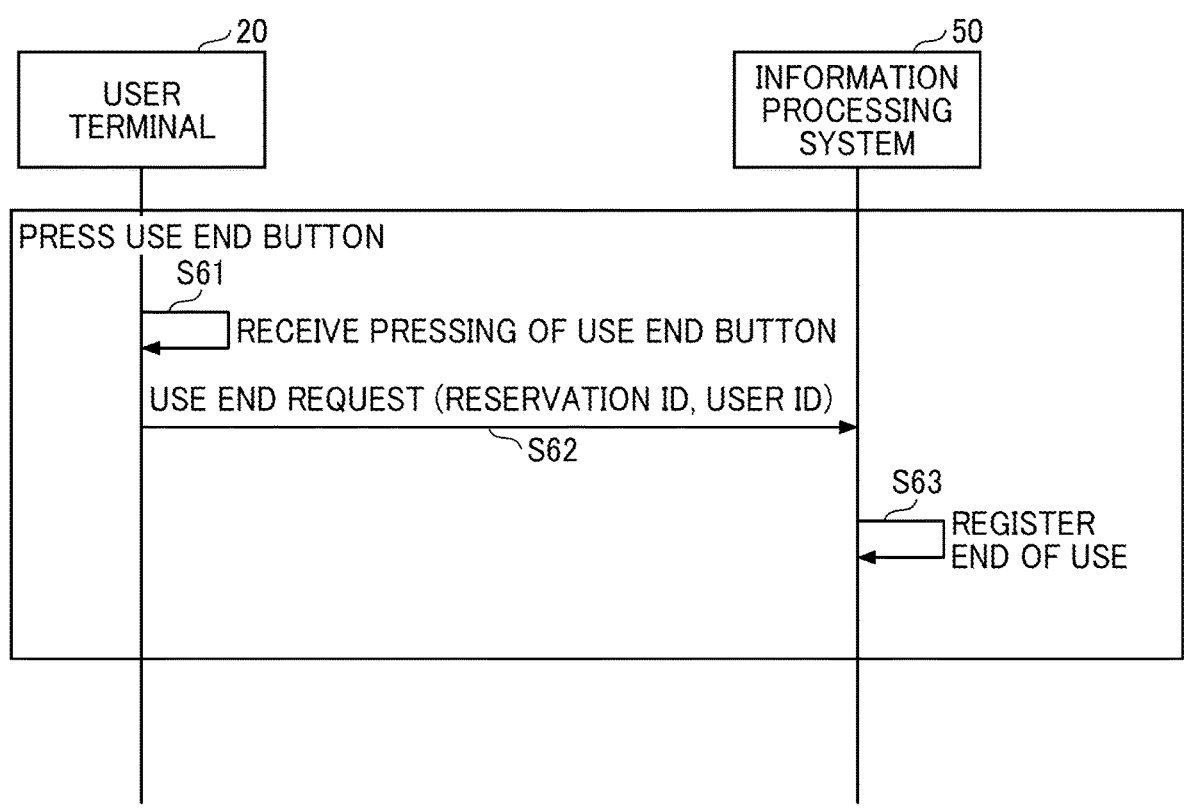
FIG. 28 is a sequence diagram illustrating an example of a process in which the user terminal communicates with the information processing system and the information processing system receives the end of use (end use button).

With reference to FIG. 28, the method of the seat user pressing the end use button 294 is described. FIG. 28 is a sequence diagram illustrating a process in which the information processing system 50 receives the end of use by the user terminal 20 and the information processing system 50 communicating with each other.

S61: Assume that the seat availability screen 270 is already displayed by the user terminal 20.

The seat user presses the end use button 294. The end use button 294 is displayed for the reservation after the start of use. The operation reception unit 23 of the user terminal 20 receives the pressing of the button.

S62: The communication unit 21 of the user terminal 20 designates the seat ID and the user ID and transmits a use end request to the information processing system 50.

S63: The communication unit 51 of the information processing system 50 receives the use end request. In response to the pressing of the end use button 294, just the start of use of the seat is registered in the reservation information designated by the seat ID. Also, the user ID transmitted by the user terminal 20 and the user ID in the reservation information should match (however, a matching determination may be made). The usage management unit 55 stores the end of use (end time of the usage history) in the reservation information storage unit 5003.

As described above, the seat user can end the use of the seat by capturing the coded information or by pressing the end use button 294.

In the case the seat user does not capture the coded information or press the end use button 294, the usage management unit 55 detects that the reservation end date and time have passed for a certain period of time or more and automatically registers the end of the use.

As described above, in the equipment utilization system of the present embodiment, the administrator can collectively register attributes for a plurality of seats by designating the area 236 on the seat map. The seat users are able to use seats suitable for workstyle and purpose of the seat user. For example, a seat user planning to concentrate on the work can reserve a seat in the concentration zone in advance or use the seat in the concentration zone, so the seat user can work without disturbed by surrounding sounds of the remote meeting.

In addition, the administrator is able to efficiently change the layout of the office by obtaining the usage rate for each purpose of use of the seats. For example, in the case the usage rate of the concentration zone is high, the layout may be changed to reflect the demand of the seat users by expanding the area of the concentration zone or increasing the number of seats.

Although the best mode for carrying out the present disclosure has been described using the examples described above, the present disclosure is not limited to these examples, and various modifications and substitutions can be made without departing from the scope of the present disclosure.

For example, a plurality of information processing systems 50 may exist, and the functions of the information processing system 50 may be distributed among a plurality of servers.

The apparatuses or devices described in the present embodiment are merely one example of plural computing environments that implement one or more embodiments disclosed herein. In some embodiments, information processing system 50 includes multiple computing devices, such as a server cluster. The multiple computing devices are configured to communicate with one another through any type of communication link, including a network, shared memory, and the like, and perform the processes disclosed herein.

The equipment utilization system 1 of the present embodiment may be referred to as a web service. The web service refers to various services provided by the internet-related technologies.

Examples of the web service include various rental services including a meeting room rental service. A system that uses the web service is called a usage system.

Further, the configuration examples illustrated in FIG. 4 and the like illustrated in the above embodiment are divided according to the main functions in order to facilitate understanding of the processing of the equipment utilization system 1. No limitation is intended by how the processes are divided or by the names of the processes. The processes implemented by the equipment utilization system 1 can be divided into a larger number of processes depending on the contents of processes. Further, one process may be divided to include a larger number of processes.

Aspects of the present disclosure are, for example, as follows.

According to a first aspect, an information processing system includes a communication unit for receiving area information for designating equipment and attribute information indicating attribute to be set to the equipment, the area information and the attribute information being set at a first terminal device communicably connected to the information processing system through a network, and a registration reception unit for storing the attribute information in association with the equipment designated by the area information received by the communication unit.

According to a second aspect, in the information processing system of the first aspect, the communication unit receives position information indicating a position set at the first terminal device, in addition to the area information and the attribute information of the equipment, and the registration reception unit stores the attribute information in association with the equipment having position information included in the area information.

According to a third aspect, in the information processing system of the first aspect or the second aspect, the equipment is being used in an office, the information processing system further includes a screen generation unit for providing the first terminal device with screen information of a screen for allowing a user to set the position of the equipment by moving an icon representing the equipment with respect to the layout image of the office, and the position of the equipment placed in the office is determined by the position of the icon.

According to a fourth aspect, in the information processing system of the third aspect, the screen generation unit generates the screen based on the layout image of the office transmitted from the first terminal device.

According to a fifth aspect, in the information processing system of the third aspect or the fourth aspect, the area information displayed at the first terminal device is displayed in different display colors depending on the attribute information.

According to a sixth aspect, in the information processing system of the fifth aspect, the registration reception unit receives setting of the display color for each attribute indicated by the attribute information.

According to a seventh aspect, in the information processing system of any one of the first aspect to the sixth aspect, the area information includes a plurality of pieces of area information that are set for the same equipment at the first terminal device, and the registration reception unit stores a plurality of pieces of the attribute information in association with the equipment included in the plurality of pieces of area information.

According to an eighth aspect, the information processing system of any one of the first aspect to the seventh aspect, further includes a search unit for searching, in response to a search request for equipment designating attribute information received from a second terminal device, the equipment associated with the attribute information designated by the search request, wherein the communication unit transmits, to the second terminal device, a search result of the equipment associated with the designated attribute information.

According to a ninth aspect, in the information processing system of the eighth aspect, when the communication unit receives from the second terminal device a use start request designating identification information of equipment and identification information of a user, the communication unit transmits, to the second terminal device, screen information of a use start screen for allowing the user to enter a use end time based on a determination that the equipment that is designated is not reserved.

According to a tenth aspect, in the information processing system of the eighth aspect, when the communication unit receives from the second terminal device a use start request designating identification information of equipment and identification information of a user, the communication unit transmits, to the second terminal device, screen information of a use start screen for allowing the user to make a reservation following a time slot reserved by another user based on a determination that the equipment that is designated has been reserved by the another user.

According to an eleventh aspect, the information processing system of the ninth aspect or the tenth aspect further includes a usage management unit for storing the start of use of the equipment in a case the equipment is reserved by a user whose identification information is transmitted from the second terminal device.

According to a twelfth aspect, the information processing system of any one of the ninth aspect to the eleventh aspect further includes a screen generation unit for providing the first terminal device with a screen that displays information related to the equipment reserved by the user, According to a thirteenth aspect, in the information processing system of the twelfth aspect, in a case the start of use of the equipment is stored in the usage management unit, the screen generation unit displays information indicating that the equipment is in use in the information related to the equipment.

According to a fourteenth aspect, in the information processing system of the twelfth aspect or the thirteenth aspect, the screen generation unit further displays information related to the equipment reserved by at least one member registered in relation to the user on the screen that displays information related to the equipment reserved by the user.

According to a fifteenth aspect, in the information processing system of the fourteenth aspect, in a case the start of use of the equipment reserved by the at least one member is stored in the usage management unit, the screen generation unit further displays information indicating that the equipment is in use in the information related to the equipment reserved by the member.

According to a sixteenth aspect, in the information processing system of the ninth aspect, the use start request is transmitted by capturing coded information attached to the equipment by the second terminal device.

According to a seventeenth aspect, in the information processing system of the eleventh aspect, in response to receiving from the second terminal device a use end request designating the identification information of the user and the identification information of the equipment being used by the user of the user identification information transmitted from the second terminal device, the usage management unit stores the end of use of the equipment.

According to an eighteenth aspect, in the information processing system of any one of the first aspect to the seventeenth aspect, the equipment is a seat.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system comprising:
circuitry configured to:
receive an arrangement of a plurality of pieces of equipment displayed on a layout image, the arrangement being set at a first terminal device communicably connected to the information processing system through a network;
receive area information including at least one of the plurality of pieces of the equipment displayed on the layout image, the area information being set at the first terminal device;
receive attribute information indicating how the equipment is used, the attribute information being set at the first terminal device;
store in one or more memories, the attribute information in association with the at least one of the plurality of pieces of the equipment included in the area information;
search, in response to a search request for equipment designating attribute information received from a second terminal device, the equipment associated with the attribute information designated by the search request;
transmit, to the second terminal device, a search result of the equipment associated with the designated attribute information; and
in response to receiving from the second terminal device, a use start request designating identification information of equipment and identification information of a user, start use of the equipment based on a determination that the equipment designated is not reserved,
wherein the at least one of the plurality of pieces of the equipment is a seat,
wherein the attribute information includes at least one of a concentration zone, a remote meeting zone, a collaboration zone, a sleeping zone, a telephone zone, or a personal computer input zone, and
wherein the circuitry is further configured to
in a case where different attribute information is set for the at least one of the plurality of pieces of the equipment, receive a selection of whether to duplicate the attribute information, overwrite the attribute information, or delete the attribute information that has already been set, and
in response to selecting to duplicate the attribute information, set multiple attribute information for the at least one of the plurality of pieces of the equipment.

2. The information processing system of claim 1, wherein the equipment is used in an office,
the layout image is a layout image of the office, and
the circuitry is further configured to:
provide the first terminal device with screen information of a screen for allowing a user to set the arrangement of the equipment by moving an icon representing each of the plurality of pieces of the equipment with respect to the layout image of the office, and
the arrangement of the equipment placed in the office is determined by a position of the icon.

3. The information processing system of claim 2, wherein the circuitry is configured to generate the screen based on the layout image of the office transmitted from the first terminal device.

4. The information processing system of claim 2, wherein the area information displayed at the first terminal device is displayed in different display colors depending on the attribute information.

5. The information processing system of claim 4, wherein the circuitry is further configured to receive setting of the display color for each attribute indicated by the attribute information.

6. The information processing system of claim 1, wherein the area information includes a plurality of pieces of area information that are set for a same piece of the equipment at the first terminal device, and
the circuitry is further configured to store in the one or more memories, a plurality of pieces of the attribute information in association with the same piece of the equipment included in the plurality of pieces of area information.

7. The information processing system of claim 1, wherein in response to receiving from the second terminal device, the use start request, the circuitry is further configured to transmit to the second terminal device, screen information of a use start screen for allowing the user to enter a use end time.

8. The information processing system of claim 1, wherein in response to receiving from the second terminal device, the use start request, the circuitry is further configured to transmit to the second terminal device, screen information of a use start screen for allowing the user to make a reservation following a time slot reserved by another user based on a determination that the equipment is designated has been reserved by the other user.

9. The information processing system of claim 7, wherein the circuitry is further configured to store in the one or more memories, the start of use of the equipment in a case where the equipment is reserved by a user whose identification information is transmitted from the second terminal device.

10. The information processing system of claim 7, wherein
the circuitry is further configured to provide the first terminal device with a screen that displays information related to the equipment reserved by the user.

11. The information processing system of claim 10, wherein
in a case where the start of use of the equipment is stored in the one or more memories, the circuitry is further configured to display on the display, information indicating that the equipment is in use in the information related to the equipment.

12. The information processing system of claim 10, wherein
the circuitry is further configured to display on the display, information related to the equipment reserved by at least one member registered in relation to the user on the screen that displays information related to the equipment reserved by the user.

13. The information processing system of claim 12, wherein
in a case where the start of use of the equipment reserved by the at least one member is stored in the one or more memories, the circuitry is further configured to display on the display, information indicating that the equipment is in use in the information related to the equipment reserved by the member.

14. The information processing system of claim 7, wherein
the use start request is transmitted by capturing coded information attached to the equipment by the second terminal device.

15. The information processing system of claim 9, wherein
in response to receiving from the second terminal device a use end request designating the identification information of a user and identification information of equipment, the circuitry is further configured to store in the one or more memories the end of use of the equipment based on a determination that the designated equipment is being used by the user indicated by the user identification information transmitted from the second terminal device.

16. An attribute setting method performed by an information processing system, the method comprising:
receiving an arrangement of a plurality of pieces of equipment displayed on a layout image, the arrangement being set at a first terminal device communicably connected to the information processing system through a network;
receiving area information including at least one of the plurality of pieces of the equipment displayed on the layout image, the area information being set at the first terminal device;
receiving attribute information indicating how the equipment is used, the attribute information being set at the first terminal device;
storing, in one or more memories, the attribute information in association with the at least one of the plurality of pieces of the equipment included in the area information that is received;
searching, in response to a search request for equipment designating attribute information received from a second terminal device, the equipment associated with the attribute information designated by the search request;
transmitting, to the second terminal device, a search result of the equipment associated with the designated attribute information; and
in response to receiving from the second terminal device, a use start request designating identification information of equipment and identification information of a user, starting use of the equipment based on a determination that the equipment designated is not reserved,
wherein the at least one of the plurality of pieces of the equipment is a seat,
wherein the attribute information includes at least one of a concentration zone, a remote meeting zone, a collaboration zone, a sleeping zone, a telephone zone, or a personal computer input zone, and
wherein, in a case where different attribute information is set for the at least one of the plurality of pieces of the equipment, a selection of whether to duplicate the attribute information, overwrite the attribute information, or delete the attribute information that has already been set is received, and
in response to selecting to duplicate the attribute information, multiple attribute information is set for the at least one of the plurality of pieces of the equipment.

17. A non-transitory recording medium which, when executed by one or more processors on an information processing system, causes the one or more processors to perform the attribute setting method of claim 16.

18. An information processing system comprising:
circuitry configured to:
receive an arrangement of a plurality of pieces of equipment displayed on a layout image, the arrangement being set at a first terminal device communicably connected to the information processing system through a network;
receive area information including at least one of the plurality of pieces of the equipment displayed on the layout image, the area information being set at the first terminal device;
receive attribute information indicating how the equipment is used, the attribute information being set at the first terminal device;
store in one or more memories, the attribute information in association with the at least one of the plurality of pieces of the equipment included in the area information;
search, in response to a search request for equipment designating attribute information received from a second terminal device, the equipment associated with the attribute information designated by the search request;
transmit, to the second terminal device, a search result of the equipment associated with the designated attribute information; and
in response to receiving from the second terminal device, a use start request designating identification information of equipment and identification information of a user, transmit to the second terminal device, screen information of a use start screen for allowing the user to enter a use end time based on a determination that the equipment that is designated is not reserved, wherein the at least one of the plurality of pieces of the equipment is a seat, and wherein the attribute information includes at least one of a concentration zone, a remote meeting zone, a collaboration zone, a sleeping zone, a telephone zone, or a personal computer input zone.

\* \* \* \* \*